(12) United States Patent
Fletcher et al.

(10) Patent No.: US 9,552,641 B2
(45) Date of Patent: Jan. 24, 2017

(54) ESTIMATION OF SHIFT AND SMALL IMAGE DISTORTION

(71) Applicant: CANON KABUSHIKI KAISHA, Tokyo (JP)

(72) Inventors: Peter Alleine Fletcher, Rozelle (AU); Eric Wai-Shing Chong, Carlingford (AU); Matthew Raphael Arnison, Umina Beach (AU); Yoichi Kazama, St Leonards (AU); Allen Peter Courtney, Mooney Mooney (AU)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 13/690,942

(22) Filed: Nov. 30, 2012

(65) Prior Publication Data

US 2013/0142396 A1    Jun. 6, 2013

(30) Foreign Application Priority Data

Dec. 1, 2011    (AU) ................................ 2011253779

(51) Int. Cl.
*G06K 9/00*    (2006.01)
*G06T 7/00*    (2006.01)

(52) U.S. Cl.
CPC .............. *G06T 7/004* (2013.01); *G06T 7/0026* (2013.01); *G06T 2207/10008* (2013.01)

(58) Field of Classification Search
CPC ...... G06T 7/2013; G06T 7/202; G06T 7/2026; G06T 7/2033; G06T 7/204; G06T 7/2046; G06T 7/0014; G06T 7/0016; G06K 9/4642; G06K 9/4609; G06K 9/6201; G06K 9/6206; G06K 9/6211
See application file for complete search history.

(56) References Cited

U.S. PATENT DOCUMENTS 3,267,745 A * 8/1966 Smead et al. .......... G01C 19/38
33/323
4,471,449 A * 9/1984 Leavitt .................. G06T 11/203
348/160

(Continued)

FOREIGN PATENT DOCUMENTS

JP    P2003-223642 A    8/2003
JP    P2009-268641 A    11/2009

OTHER PUBLICATIONS

Yoshimura, S & T. Kanade. "Fast template matching based on the normalized correlation by using multiresolution eigenimages." 'Advanced Robotic Systems and the Real World', IROS '94: Proceedings of the IEEE/RSJ/GI International Conference on Intelligent Robots and Systems '94, Munich, Germany, Sep. 12-16, 1994. IEEE, 1994. vol. 3: 2086-2093.

*Primary Examiner* — Avinash Yentrapati
(74) *Attorney, Agent, or Firm* — Canon USA, Inc. I.P. Division

(57) ABSTRACT

Disclosed is method of measuring the displacement between a reference region of a reference image and a sample region of a sample image. The method spatially varies the reference region using a one-dimensional filter having complex kernel values, wherein a length (radius) and direction (angle or tangent segment) of the filter is a function of position in the reference region. The method then measures a displacement between the reference region and the sample region by comparing the spatially varied reference region and the sample region.

15 Claims, 21 Drawing Sheets

(56) References Cited

U.S. PATENT DOCUMENTS

| | | | | |
|---|---|---|---|---|
| 4,850,028 A * | 7/1989 | Kawamura | G06T 3/606 | 348/583 |
| 4,885,786 A * | 12/1989 | Anderson | H04N 1/3935 | 345/671 |
| 4,893,971 A * | 1/1990 | Watanabe | B23F 15/06 | 409/80 |
| 5,422,961 A * | 6/1995 | Simard | G06K 9/6255 | 382/159 |
| 5,757,956 A * | 5/1998 | Koljonen | G06T 7/0044 | 348/94 |
| 6,167,164 A * | 12/2000 | Lee | G06T 5/20 | 375/E7.19 |
| 6,266,452 B1 * | 7/2001 | McGuire | G06K 9/32 | 382/280 |
| 7,072,525 B1 * | 7/2006 | Covell | G06T 5/50 | 382/261 |
| 7,505,609 B1 * | 3/2009 | Hartman | G06K 9/3208 | 382/103 |
| 7,840,096 B2 * | 11/2010 | Song | G06T 3/403 | 382/238 |
| 2001/0016055 A1 * | 8/2001 | Harkless | G06K 9/0008 | 382/115 |
| 2002/0048412 A1 * | 4/2002 | Wredenhagen | G06T 3/4007 | 382/278 |
| 2003/0185431 A1 * | 10/2003 | Hong | G06K 9/6255 | 382/147 |
| 2004/0184668 A1 * | 9/2004 | Long | G06T 3/403 | 382/266 |
| 2005/0163398 A1 * | 7/2005 | Ioka | G06T 7/0024 | 382/284 |
| 2005/0271300 A1 * | 12/2005 | Pina | G06K 9/4647 | 382/294 |
| 2006/0171687 A1 * | 8/2006 | Aiso | G06T 5/50 | 386/230 |
| 2006/0193388 A1 * | 8/2006 | Woods | H04N 19/647 | 375/240.16 |
| 2006/0257010 A1 * | 11/2006 | George | G06T 11/006 | 382/131 |
| 2007/0007382 A1 * | 1/2007 | De Hillerin | G06F 17/5018 | 244/3.1 |
| 2008/0080789 A1 * | 4/2008 | Marks | A63F 13/06 | 382/296 |
| 2009/0201555 A1 * | 8/2009 | Natori | G06T 7/0004 | 358/1.18 |
| 2011/0069752 A1 * | 3/2011 | Watanabe | H04N 19/46 | 375/240.03 |
| 2011/0206119 A1 * | 8/2011 | Bivolarsky | H04N 19/105 | 375/240.12 |
| 2011/0206132 A1 * | 8/2011 | Bivolarsky | H04N 19/107 | 375/240.24 |
| 2012/0002113 A1 * | 1/2012 | Nishio | H04N 9/045 | 348/624 |
| 2012/0044990 A1 * | 2/2012 | Bivolarsky | H04N 19/105 | 375/240.03 |
| 2012/0170650 A1 * | 7/2012 | Chong | H04N 19/593 | 375/240.12 |
| 2012/0195483 A1 * | 8/2012 | Schondube | A61B 6/032 | 382/131 |
| 2012/0207347 A1 * | 8/2012 | Albu | G06T 7/20 | 382/103 |
| 2012/0213423 A1 * | 8/2012 | Xu | A61B 5/0073 | 382/131 |
| 2012/0242870 A1 * | 9/2012 | Koizumi | H04N 5/2258 | 348/241 |
| 2012/0243797 A1 * | 9/2012 | Di Venuto Dayer | G06K 9/00577 | 382/218 |
| 2013/0089260 A1 * | 4/2013 | Pires | G06K 9/4619 | 382/190 |
| 2013/0142396 A1 * | 6/2013 | Fletcher | G06T 7/004 | 382/106 |
| 2013/0236085 A1 * | 9/2013 | Chen | G06T 7/0004 | 382/145 |
| 2013/0304386 A1 * | 11/2013 | Niu | A61B 6/037 | 702/19 |
| 2013/0304399 A1 * | 11/2013 | Chen | G06T 7/0004 | 702/40 |
| 2014/0016824 A1 * | 1/2014 | Taguchi | G06K 9/3275 | 382/103 |
| 2014/0211060 A1 * | 7/2014 | Funao | G06T 3/4015 | 348/311 |
| 2014/0233841 A1 * | 8/2014 | Noyel | G06T 7/001 | 382/141 |
| 2014/0240549 A1 * | 8/2014 | Seshadrinathan | H04N 5/2353 | 348/239 |
| 2015/0049366 A1 * | 2/2015 | Shibata | H04N 1/4051 | 358/3.07 |
| 2015/0097993 A1 * | 4/2015 | Oniki | H04N 5/23229 | 348/241 |
| 2015/0227130 A1 * | 8/2015 | Terada | B23B 3/162 | 700/186 |

* cited by examiner

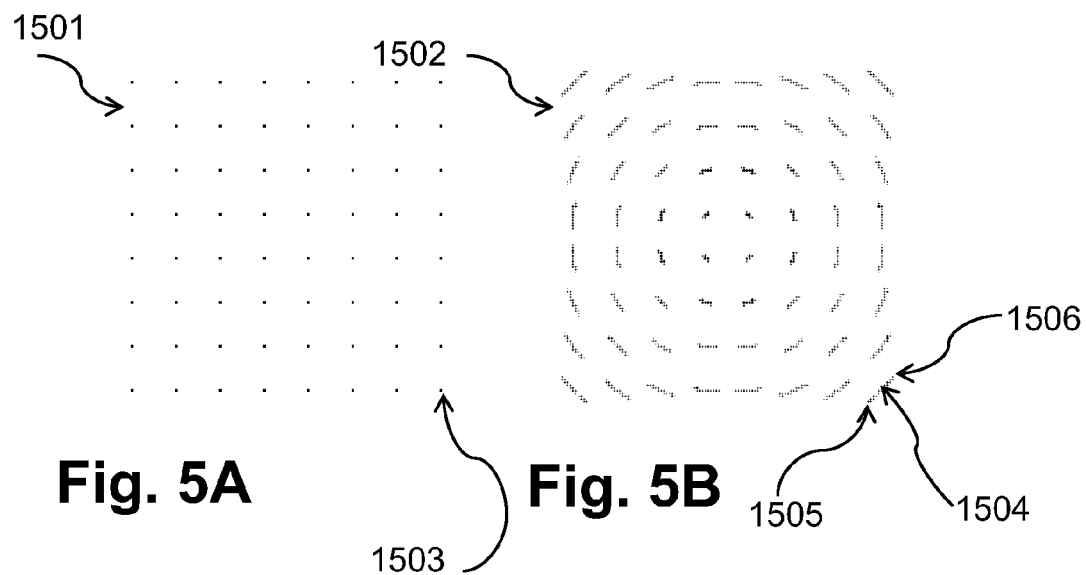
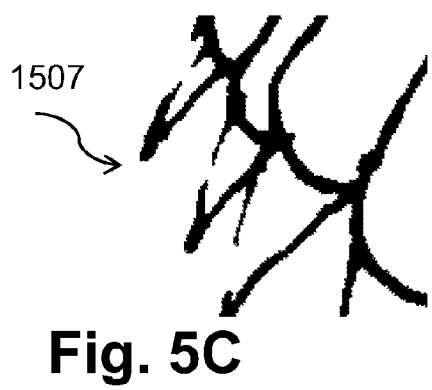
Fig. 5A   Fig. 5B   Fig. 5C   Fig. 5D

ESTIMATION OF SHIFT AND SMALL IMAGE DISTORTION

REFERENCE TO RELATED PATENT APPLICATION(S)

This application claims the benefit under 35 U.S.C. §119 of the filing date of Australian Patent Application No. 2011253779, filed Dec. 1, 2011, hereby incorporated by reference in its entirety as if fully set forth herein.

TECHNICAL FIELD

The current invention relates to methods for the estimation of a relative shift or other small spatial distortions between two similar images.

BACKGROUND

Many applications require the measurement of relative spatial distortions between a pair of similar two-dimensional images. Each pair will often consist of a faithful representation of an original, which may be called a "reference" image, and a degraded representation of this original, which may be called the "target" image.

The degradation of the target image with respect to the reference image can take many forms. As examples, the target image may be a printed and scanned version of the reference image; it may be a feature which has moved in a portion of a video sequence; or it may be obtained from a digital photograph captured under different conditions from the reference image.

The terms "reference" and "target" can be interchanged for some applications, and there may not be differences in quality between the two images. Sometimes they may be taken from a single image, or from a series of images.

Degradation in quality can arise due to spatial distortion between the two images. Estimating the distortion can provide for accommodation or correction of the distortion. The basis of many spatial distortion estimation methods is shift estimation, in which an estimate is made of the translation required of one image to best align it with the other.

Where spatial distortion is not just a simple translation, shift estimation can be used to determine translation between pairs of reference and target tiles (also referred to as patches) extracted from the reference and target images respectively. A collection of shift estimates from multiple locations in the images can be used to determine more complicated spatial distortions such as rotation, scaling, arbitrary affine distortion, perspective distortion, and non-linear distortion, such as barrel distortion.

The measurement of spatial distortion between tiles supports many applications. Such a measurement can be used for the direct measurement of alignment quality in printing and/or scanning devices; for assisting in the adjustment of the printing or scanning devices; or as a pre-processing step to allow accurate alignment of two images, one directly over the other, to allow direct comparison of a printed copy with its original. This comparison can allow evaluation of the quality of printing, and also verification that the printed output is free from defects. Such measurement can also provide information about the physical state of an imaging system, where a rotation angle, or a scale factor, represent a proxy for another physical variables in the system.

Several techniques have been used for such shift estimation, including correlation, phase correlation, least-squares fitting, and gradient-based shift estimation (GBSE).

The correlation operation, denoted by $\otimes$, is a method of comparing two tiles and which calculates the summed products of corresponding pixels in two tiles at multiple shift positions:

$$h = f \otimes g \Leftrightarrow h(x, y) = \sum_{i,j} f(i, j) \cdot g(x+i, y+j)$$

If there exists a position of maximum matching overlap between the two tiles, the value of the correlation will be a maximum at this position.

Correlation can be performed efficiently using the Fourier Transform, where $\mathcal{F}(f)$ is the Fourier transform of f, $\mathcal{F}^{-1}(f)$ is the inverse Fourier transform, and, $\mathcal{F}(g)^*$ is the conjugate of the Fourier transform of g:

$$f \otimes g = \mathcal{F}^{-1}((\mathcal{F}(f) \cdot \mathcal{F}(g)^*)$$

To achieve a sharp, easily-detectible correlation peak, phase correlation, in which each term in the correlation product is replaced by a complex value with unit modulus, can be used, and is denoted by $\hat{\otimes}$:

$$(f \hat{\otimes} g) = \mathcal{F}^{-1}\left(\frac{(\mathcal{F}(f) \cdot \mathcal{F}(g)^*)(u, v)}{|(\mathcal{F}(f) \cdot \mathcal{F}(g)^*)(u, v)|}\right)$$

A pre-processing step for the reference and target tile is necessary to assist with phase correlation as a shift-estimation method. In a phase correlation operation, the edges of a tile can form a very strong feature, as they can appear very similar to a strong line segment. This may result in a "false" correlation peak being formed at the origin by a match of the edges of one tile with the edges of the other, or anywhere else by a match of the edges of one tile with a line feature in the other. To mitigate this effect, the two tiles can be pre-processed using a combination of padding, high-pass filtering, and a half-Hann window, or similar, on the edge pixels. Such techniques are known in the art. Applying a window, such as a half Hann window, to pixels near the tile edges is sometimes referred to in this disclosure as hedging.

It is also necessary to choose a tile containing appropriate detail for shift estimation purposes. The tile must contain sufficient high-frequency or mid-frequency information with orientation of at least two substantially different angles. If no high-frequency information is present in the tile, the correlation peak will be broad and subject to distortion by any lighting gradient in the input tiles, and is likely to lead to inaccurate shift estimation. If the frequency content exists substantially in a single direction, then shift estimation will be inaccurate in a direction orthogonal to the tile features. If a tile contains periodic features, such as a grid of lines or a dotted line, then there may be ambiguity in a matching shift, possibly resulting in incorrect shift estimation also.

If the two tiles are shifted relative to each other, and have been chosen to have appropriate detail for shift estimation, then a correlation peak will appear at a displacement from the origin directly corresponding to the shift between the two tiles.

By measuring tiles of corresponding portions of the reference and the target image in several places, a more complicated global transform than just shift can be measured.

For example, by measuring relative shift at three non-collinear positions, an affine transform can be derived relating the two tiles. By measuring relative shift at many points, a least-squares fit to some global transformation may be derived, or a complete "warp map" estimated for one or both images which can relate every pixel in one image to a pixel position in the other.

In many applications, it is common for there to be a small relative rotation between the two tiles being measured. For example, the rotation may be caused by a rotation of a page on a scanner platen, or the rotation of paper inside the feed path during printing, or by a small misalignment of a camera.

The introduction of a small relative rotation between two tiles can have a marked and deleterious effect on shift estimation. For example, for a 128×128 tile, a measured accuracy of phase correlation is reduced from an error of below 0.02 pixels at 0°, to an error of 0.15 pixels at 1° and almost a whole pixel at 2°.

Aside from the effect of a small rotation on individual tiles, a small rotation can cause the local shift between two images to change markedly across the whole image. For example, a 600 dpi scan of a piece of Letter-sized paper of 8.5×11 inches has dimensions of approximately 5,100×6,600 pixels. A 1° relative rotation between the reference and the scanned target image will result in a local shift of more than 100 pixels difference between the top and the bottom of the page. Such a shift will substantially reduce the common overlap between two tiles of size 128×128 and hence greatly reduce shift estimation accuracy for these tiles.

The two negative effects of rotation on shift estimation, namely decreasing accuracy and larger shift, both combine to greatly reduce shift estimation accuracy, to the point where shift estimation is likely to fail completely.

Such effects require that several, potentially inaccurate, measurements must be taken at corresponding positions of the reference and target images before a global transform can be derived. Because of the potential unknown shift between the reference and target tiles, it is also necessary to extract tiles of size much larger than is necessary to estimate shift in exactly corresponding tiles in order to ensure that there will be sufficient overlapping in relatively shifted tiles.

A spatially varying blur has been proposed to reduce the effect of rotation and scaling on correlation. However, such a blur will remove almost all high frequencies in a reference tile except at the very centre of the tile. As it is the high frequencies in a tile which provide the sharpness of a correlation peak, this operation can also greatly reduce shift estimation accuracy.

Correction measures have been proposed for the GBSE method which afford some robustness against rotation and scaling. However, such measures are only effective where the largest shift in tiles being measured is less than a single pixel. Under a rotation of 2°, the difference in shift from the top to the bottom of a tile is 2 pixels for a 64×64 tile, and 4.5 pixels for a 128×128 tile.

Two simple techniques can reduce the effect of rotation on shift estimation methods. Using a smaller tile can reduce the effect of rotation on shift estimation, but will also reduce the maximum shift that can be estimated. Down-sampling both tiles before measurement can also reduce the effect of rotation on shift estimation, but will also reduce accuracy, as measured shifts will be only a fraction of the true shift.

Note that relative image scaling has a similar effect to that of rotation on shift estimation. However, a relative scaling can usually be discounted in many applications, because the scaling factor of optical and print devices is known prior to the commencement of processing and so can be corrected automatically, if it is necessary to do so.

A least-squares fit can model and measure rotation, scaling and/or shift for pairs of tiles, but such methods usually involve an iterative search, and can be very slow.

Fourier techniques involving log-polar transforms and multiple correlations can also be used to estimate rotation, scaling and translation over a very wide range, but they are also very slow.

While it is possible to achieve some robustness to rotation with the above methods, this robustness is generally at the expense of measurement accuracy, and these methods do not provide a way to directly estimate rotation angle or scaling using only a single measurement.

SUMMARY

According to a first aspect of the present disclosure, there is provided a method of measuring the displacement between a reference region of a reference image and a sample region of a sample image, the method comprising: spatially varying the reference region using a one-dimensional filter, wherein a length and direction of the filter is a function of position in the reference region; and measuring a displacement between the reference region and the sample region by comparing the spatially varied reference region and the sample region.

Preferably the one-dimensional filter comprises complex kernel values Desirably the reference region and the sample region are compared by matching the regions using correlation, the matching comprising: determining a location of a maximum correlation value of a correlation of the reference region and sample region; and using the location of the maximum correlation value to estimate the displacement between the reference region and the sample region. Preferably a phase of the maximum correlation value is used to further determine a spatial distortion parameter between the reference region and the sample region. Advantageously the function of the filter is a function of radius and angle. Preferably the direction of the filter is one of perpendicular to the radius and parallel to the radius. Also desirably the length of the filter is proportional to the radius.

The method may further comprise estimating shift and rotation between the reference region and the sample region in a single correlation. The method may further comprise estimating shift and scale factor between the reference region and the sample region in a single operation. Desirably the comparing of the regions comprises performing a shift estimation upon the regions. Here, the shift estimation may include gradient-based shift estimation. Typically the reference region and the sample region are corresponding regions of related images.

According to another aspect of the present disclosure, there is provided a method of measuring the displacement between a reference region of a reference image and a sample region of a sample image. The method comprises setting pixels values outside a central predetermined radius of the reference region to zero to thereby form a modified reference region, wherein the pixels set to zero occupy an area larger than 75% of the modified reference region; and measuring a displacement between the reference region and the sample region by comparing the pixels of modified reference region and the sample region.

According to another aspect of the present disclosure, there is provided a method of correcting the displacement between a reference region of a reference image and a sample region of a related sample image, the images being obtained by scanning in a slow scan direction and a fast scan direction. This method comprises: spatially varying the reference region in the a direction parallel to the slow scan direction using a one-dimensional filter having complex kernel values, wherein a length of the filter is a function of position in the reference region; measuring a shift and scale factor in the particular direction between the reference region and the sample region by comparing the spatially varied reference region and the sample region; determining an overlap area between the reference image and the sample image; estimating shift in the overlap area; and correcting the sample region using the estimated shift and the measured shift and scale factor in the particular direction.

According to another aspect of the present disclosure, there is provided a method of measuring the displacement between a reference region of a reference image and a sample region of a sample image. This method comprises: spatially varying the reference region using a one-dimensional filter, preferably having complex kernel values, wherein a length and angle of the filter is a function of position in the reference region; replacing each pixel value in the filtered reference region with a mean pixel value determined from pixels that intersect the corresponding pixel location when rotated in a range determined by the angle; and measuring a displacement between the reference region and the sample region by comparing the replaced pixels of the reference region with pixels of the sample region.

According to another aspect of the present disclosure, there is provided a method of measuring a spatial distortion parameter between a reference region of a reference image and a sample region of a sample image, the method comprising: spatially varying the reference region using a one-dimensional filter with complex kernel values to form a filtered reference region where the length and direction of the filter is a function of position in reference image; correlating the filtered reference region and the sample region; determining the phase of a maximum correlation value of the correlated filtered reference region and sample region; and using the phase of the maximum correlation value to estimate a spatial distortion parameter between the reference region and the sample region.

In another aspect, disclosed is a method of measuring the displacement between a reference region of a reference image and a sample region of a sample image, said method comprising: spatially varying the reference region according to a spatial transform described by a single parameter to form a plurality of spatially transformed regions; overlaying the spatially transformed regions to form a filtered region; and measuring a displacement between the reference region and the sample region by comparing the filtered region and the sample region. Preferably the overlaying comprises determining an element-wise average of the spatially transformed regions.

In another aspect, disclosed is a method of measuring a spatial distortion parameter between a reference region of a reference image and a sample region of a sample image, the method comprising: spatially varying the reference region using a one-dimensional filter with complex kernel values to form a complex filtered reference region where the length and direction of the filter is a function of position in reference image; pixel-wise multiplying the complex filtered reference region and the sample region and summing the resulting complex pixel values to form a matching parameter value for the regions; determining a phase of the matching parameter value; and using the phase of the matching parameter value to estimate a spatial distortion parameter between the reference region and the sample region. This method may further comprise receiving a shift estimation value associated with the reference region, and using the shift estimation value to determine the sample region.

In a further aspect, disclosed is a method of measuring a spatial distortion parameter between a reference region of a reference image and a sample region of a sample image, the method comprising: receiving a spatially varied complex filtered reference region; pixel-wise multiplying the complex filtered reference region and the sample region and summing the resulting complex pixel values to form a matching parameter value for the regions; determining a phase of the matching parameter value; and using the phase of the matching parameter value to estimate a spatial distortion parameter between the reference region and the sample region.

Other aspects are also disclosed.

BRIEF DESCRIPTION OF THE DRAWINGS

At least one embodiment of the present invention will now be described with reference to the following drawings, in which:

FIGS. 5A to 5D show the results of applying the brosc rotation filter to a grid of dots, and a dinosaur foot;

DETAILED DESCRIPTION INCLUDING BEST MODE

Figure 12A:
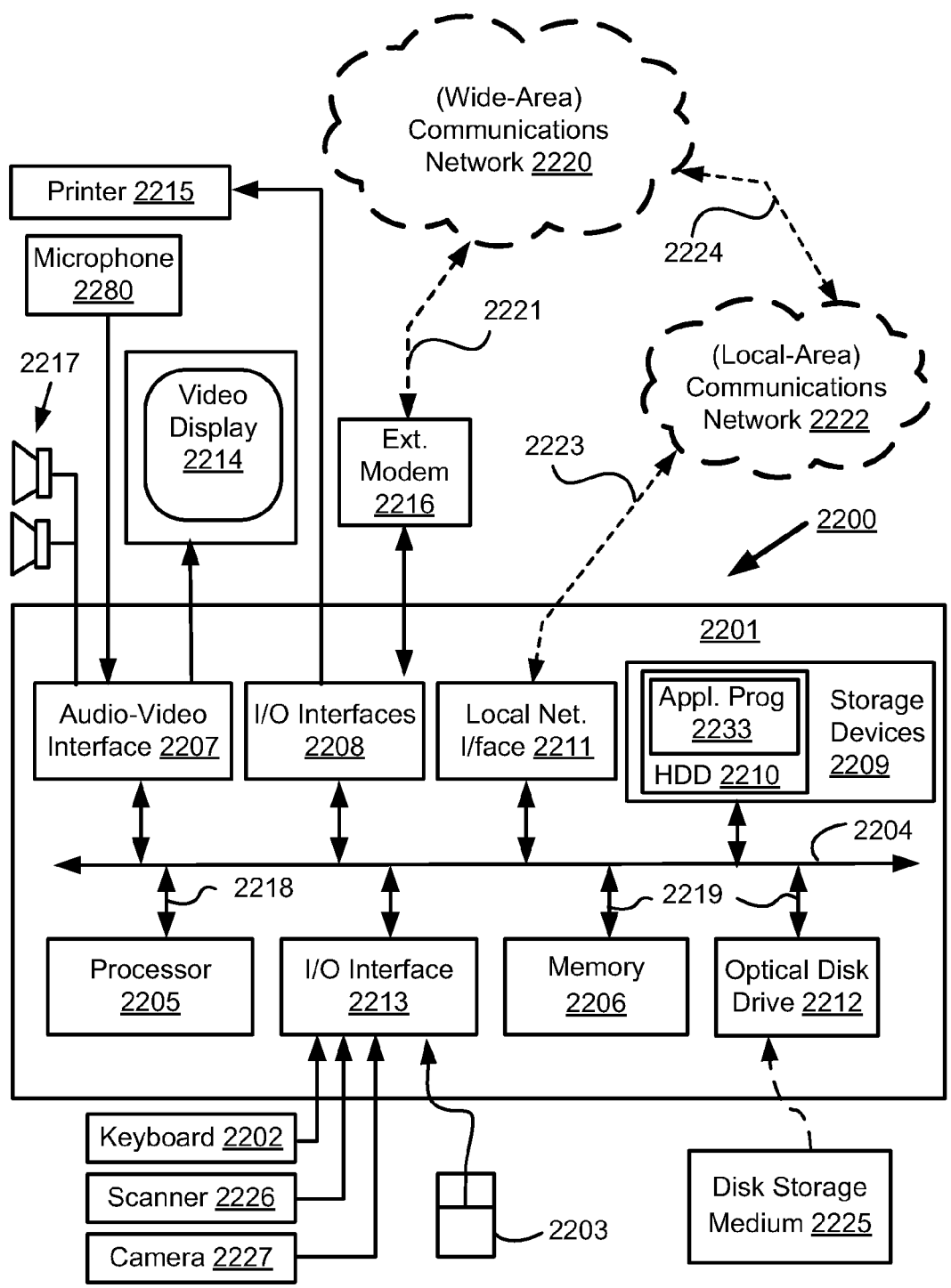
FIGS. 12A and 12B show a schematic block diagram representation of a general purpose computer upon which the arrangements described may be performed.
Figure 12B:
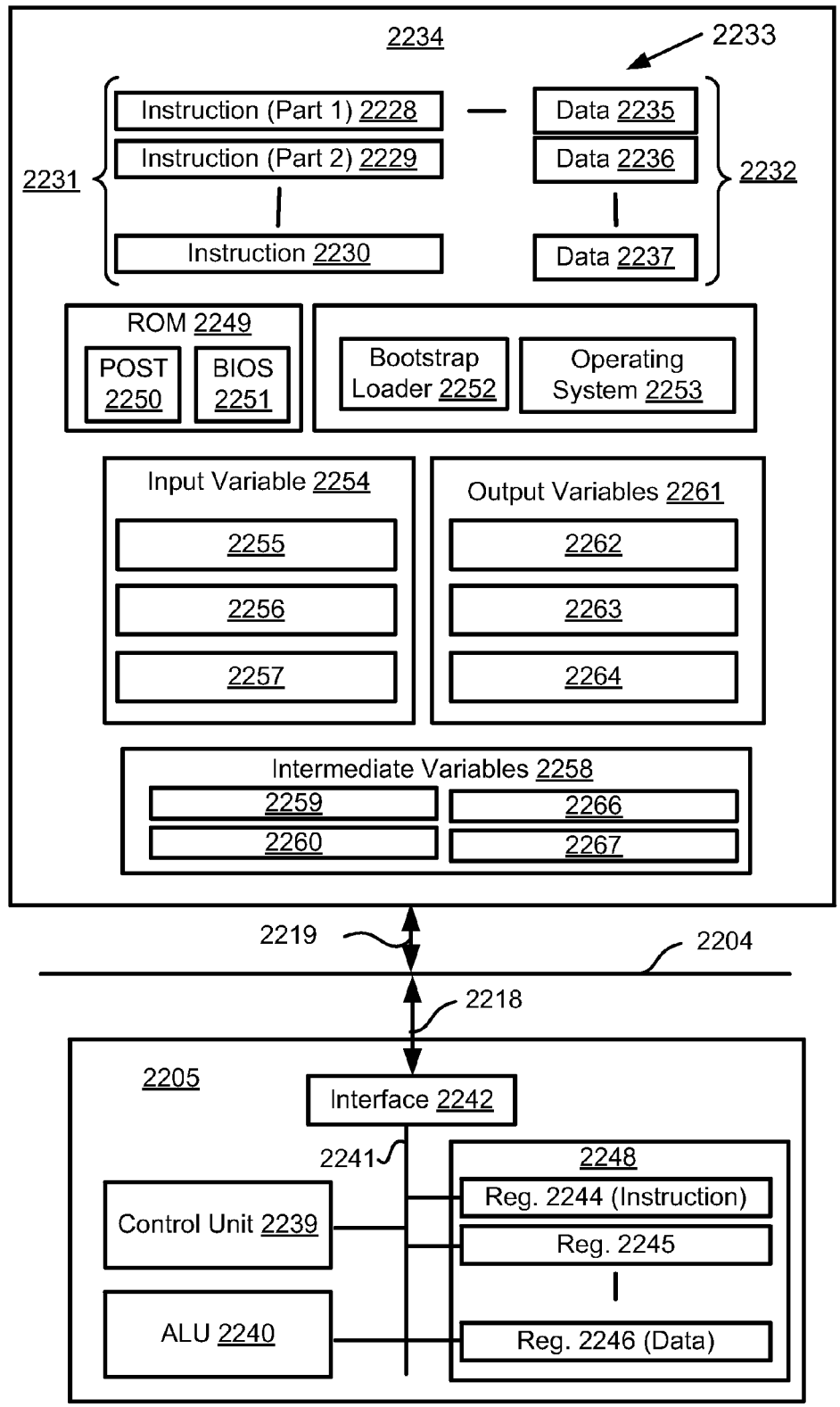

FIGS. 12A and 12B depict a general-purpose computer system 2200, upon which the various arrangements of shift estimation to be described can be practiced.

As seen in FIG. 12A, the computer system 2200 includes: a computer module 2201; input devices such as a keyboard 2202, a mouse pointer device 2203, a scanner 2226, a camera 2227, and a microphone 2280; and output devices including a printer 2215, a display device 2214 and loudspeakers 2217. The camera 2227 may be a source of images to be processed in the manner to be described. An external Modulator-Demodulator (Modem) transceiver device 2216 may be used by the computer module 2201 for communicating to and from a communications network 2220 via a connection 2221. The communications network 2220 may be a wide-area network (WAN), such as the Internet, a cellular telecommunications network, or a private WAN. Where the connection 2221 is a telephone line, the modem 2216 may be a traditional "dial-up" modem. Alternatively, where the connection 2221 is a high capacity (e.g., cable) connection, the modem 2216 may be a broadband modem. A wireless modem may also be used for wireless connection to the communications network 2220.

The computer module 2201 typically includes at least one processor unit 2205, and a memory unit 2206. For example, the memory unit 2206 may have semiconductor random access memory (RAM) and semiconductor read only memory (ROM). The computer module 2201 also includes an number of input/output (I/O) interfaces including: an audio-video interface 2207 that couples to the video display 2214, loudspeakers 2217 and microphone 2280; an I/O interface 2213 that couples to the keyboard 2202, mouse 2203, scanner 2226, camera 2227 and optionally a joystick or other human interface device (not illustrated); and an interface 2208 for the external modem 2216 and printer 2215. In some implementations, the modem 2216 may be incorporated within the computer module 2201, for example within the interface 2208. The computer module 2201 also has a local network interface 2211, which permits coupling of the computer system 2200 via a connection 2223 to a local-area communications network 2222, known as a Local Area Network (LAN). As illustrated in FIG. 12A, the local communications network 2222 may also couple to the wide network 2220 via a connection 2224, which would typically include a so-called "firewall" device or device of similar functionality. The local network interface 2211 may comprise an Ethernet™ circuit card, a Bluetooth™ wireless arrangement or an IEEE 802.11 wireless arrangement; however, numerous other types of interfaces may be practiced for the interface 2211. The networks 2220 and 2222 may be sources of images to be processed in the manner to be described.

The I/O interfaces 2208 and 2213 may afford either or both of serial and parallel connectivity, the former typically being implemented according to the Universal Serial Bus (USB) standards and having corresponding USB connectors (not illustrated). Storage devices 2209 are provided and typically include a hard disk drive (HDD) 2210. Other storage devices such as a floppy disk drive and a magnetic tape drive (not illustrated) may also be used. An optical disk drive 2212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 2200.

The components 2205 to 2213 of the computer module 2201 typically communicate via an interconnected bus 2204 and in a manner that results in a conventional mode of operation of the computer system 2200 known to those in the relevant art. For example, the processor 2205 is coupled to the system bus 2204 using a connection 2218. Likewise, the memory 2206 and optical disk drive 2212 are coupled to the system bus 2204 by connections 2219. Examples of computers on which the described arrangements can be practised include IBM-PC's and compatibles, Sun Sparcstations, Apple Mac™ or a like computer systems.

The methods of displacement and spatial distortion measurement may be implemented using the computer system 2200 wherein the processes of FIGS. 1 to 11 and FIGS. 13 to 20, to be described, may be implemented as one or more software application programs 2233 executable within the computer system 2200. In particular, the steps of the methods of shift estimation are effected by instructions 2231 (see FIG. 12B) in the software 2233 that are carried out within the computer system 2200. The software instructions 2231 may be formed as one or more code modules, each for performing one or more particular tasks. The software may also be divided into two separate parts, in which a first part and the corresponding code modules performs the shift estimation methods and a second part and the corresponding code modules manage a user interface between the first part and the user.

The software may be stored in a computer readable medium, including the storage devices described below, for example. The software is loaded into the computer system 2200 from the computer readable medium, and then executed by the computer system 2200. A computer readable medium having such software or computer program recorded on the computer readable medium is a computer program product. The use of the computer program product in the computer system 2200 preferably effects an advantageous apparatus for shift estimation in images.

The software 2233 is typically stored in the HDD 2210 or the memory 2206. The software is loaded into the computer system 2200 from a computer readable medium, and executed by the computer system 2200. Thus, for example, the software 2233 may be stored on an optically readable disk storage medium (e.g., CD-ROM) 2225 that is read by the optical disk drive 2212. A computer readable medium having such software or computer program recorded on it is a computer program product. The use of the computer program product in the computer system 2200 preferably effects an apparatus for shift estimation in images.

In some instances, the application programs 2233 may be supplied to the user encoded on one or more CD-ROMs 2225 and read via the corresponding drive 2212, or alternatively may be read by the user from the networks 2220 or 2222. Still further, the software can also be loaded into the computer system 2200 from other computer readable media. Computer readable storage media refers to any non-transitory tangible storage medium that provides recorded instructions and/or data to the computer system 2200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 2201. Examples of transitory or non-tangible computer readable transmission media that may also participate in the provision of software, application programs, instructions and/or data to the computer module 2201 include radio or infra-red transmission channels as well as a network connection to another computer or networked device, and the Internet or Intranets including e-mail transmissions and information recorded on Websites and the like.

The second part of the application programs 2233 and the corresponding code modules mentioned above may be executed to implement one or more graphical user interfaces (GUIs) to be rendered or otherwise represented upon the display 2214. Through manipulation of typically the keyboard 2202 and the mouse 2203, a user of the computer system 2200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2217 and user voice commands input via the microphone 2280.

FIG. 12B is a detailed schematic block diagram of the processor 2205 and a "memory" 2234. The memory 2234 represents a logical aggregation of all the memory modules (including the HDD 2209 and semiconductor memory 2206) that can be accessed by the computer module 2201 in FIG. 12A.

When the computer module 2201 is initially powered up, a power-on self-test (POST) program 2250 executes. The POST program 2250 is typically stored in a ROM 2249 of the semiconductor memory 2206 of FIG. 12A. A hardware device such as the ROM 2249 storing software is sometimes referred to as firmware. The POST program 2250 examines hardware within the computer module 2201 to ensure proper functioning and typically checks the processor 2205, the memory 2234 (2209, 2206), and a basic input-output systems software (BIOS) module 2251, also typically stored in the ROM 2249, for correct operation. Once the POST program 2250 has run successfully, the BIOS 2251 activates the hard disk drive 2210 of FIG. 12A. Activation of the hard disk drive 2210 causes a bootstrap loader program 2252 that is resident on the hard disk drive 2210 to execute via the processor 2205. This loads an operating system 2253 into the RAM memory 2206, upon which the operating system 2253 commences operation. The operating system 2253 is a system level application, executable by the processor 2205, to fulfil various high level functions, including processor management, memory management, device management, storage management, software application interface, and generic user interface.

The operating system 2253 manages the memory 2234 (2209, 2206) to ensure that each process or application running on the computer module 2201 has sufficient memory in which to execute without colliding with memory allocated to another process. Furthermore, the different types of memory available in the system 2200 of FIG. 12A must be used properly so that each process can run effectively. Accordingly, the aggregated memory 2234 is not intended to illustrate how particular segments of memory are allocated (unless otherwise stated), but rather to provide a general view of the memory accessible by the computer system 2200 and how such is used.

As shown in FIG. 12B, the processor 2205 includes a number of functional modules including a control unit 2239, an arithmetic logic unit (ALU) 2240, and a local or internal memory 2248, sometimes called a cache memory. The cache memory 2248 typically includes a number of storage registers 2244-2246 in a register section. One or more internal busses 2241 functionally interconnect these functional modules. The processor 2205 typically also has one or more interfaces 2242 for communicating with external devices via the system bus 2204, using a connection 2218. The memory 2234 is coupled to the bus 2204 using a connection 2219.

The application program 2233 includes a sequence of instructions 2231 that may include conditional branch and loop instructions. The program 2233 may also include data 2232 which is used in execution of the program 2233. The instructions 2231 and the data 2232 are stored in memory locations 2228, 2229, 2230 and 2235, 2236, 2237, respectively. Depending upon the relative size of the instructions 2231 and the memory locations 2228-2230, a particular instruction may be stored in a single memory location as depicted by the instruction shown in the memory location 2230. Alternately, an instruction may be segmented into a number of parts each of which is stored in a separate memory location, as depicted by the instruction segments shown in the memory locations 2228 and 2229.

In general, the processor 2205 is given a set of instructions which are executed therein. The processor 1105 waits for a subsequent input, to which the processor 2205 reacts to by executing another set of instructions. Each input may be provided from one or more of a number of sources, including data generated by one or more of the input devices 2202, 2203, data received from an external source across one of the networks 2220, 2202, data retrieved from one of the storage devices 2206, 2209 or data retrieved from a storage medium 2225 inserted into the corresponding reader 2212, all depicted in FIG. 12A. The execution of a set of the instructions may in some cases result in output of data. Execution may also involve storing data or variables to the memory 2234.

The disclosed shift estimation arrangements use input variables 2254, which are stored in the memory 2234 in corresponding memory locations 2255, 2256, 2257. The shift estimation arrangements produce output variables 2261, which are stored in the memory 2234 in corresponding memory locations 2262, 2263, 2264. Intermediate variables 2258 may be stored in memory locations 2259, 2260, 2266 and 2267.

Referring to the processor 2205 of FIG. 12B, the registers 2244, 2245, 2246, the arithmetic logic unit (ALU) 2240, and the control unit 2239 work together to perform sequences of micro-operations needed to perform "fetch, decode, and execute" cycles for every instruction in the instruction set making up the program 2233. Each fetch, decode, and execute cycle comprises:

(a) a fetch operation, which fetches or reads an instruction 2231 from a memory location 2228, 2229, 2230;

(b) a decode operation in which the control unit 2239 determines which instruction has been fetched; and (c) an execute operation in which the control unit 2239 and/or the ALU 2240 execute the instruction.

Thereafter, a further fetch, decode, and execute cycle for the next instruction may be executed. Similarly, a store cycle may be performed by which the control unit 2239 stores or writes a value to a memory location 2232.

Each step or sub-process in the processes of FIGS. 1 to 11 and FIGS. 13 to 20 is associated with one or more segments of the program 2233 and is performed by the register section 2244, 2245, 2247, the ALU 2240, and the control unit 2239 in the processor 2205 working together to perform the fetch, decode, and execute cycles for every instruction in the instruction set for the noted segments of the program 2233.

The methods of shift estimation may alternatively be implemented in dedicated hardware such as one or more integrated circuits performing the functions or sub functions of shift estimation. Such dedicated hardware may include graphic processors, digital signal processors, or one or more microprocessors and associated memories.

A fundamental reason that results in scaling and rotation being damaging to shift estimation is that where two tiles of an image are rotated relative to each other, there are a multitude of individual multi-pixel shifts across the two tiles being compared.

With a correlation method, these multiple shifts manifest as multiple correlation peaks in the correlation image. Each peak will be of different strengths depending upon the amount of detail in each corresponding position with the tile. Because the contents of the tiles being compared cannot necessarily be selected for best correlation behaviour, the actual measurement position of the shift estimation, as reflected in the strongest correlation peak, may be anywhere in the tile.

With a gradient-based shift estimation method, shift estimation works only for shifts smaller than one pixel. The influence on the shift estimate of regions of the tile which are displaced by more than one pixel will be unknown, and is likely to ruin the shift estimation.

As has been noted previously, it is possible to limit the effect of having multiple displacements in a tile by simply using a very small tile, for example of size 32×32, during shift estimation. However, use of such a tile limits the amount of image information which informs the shift estimate, and the maximum measurable displacement is limited to 16 pixels, in this example, unless down-sampling is used.

Presently disclosed are preferred methods which ameliorate the problems with shift estimation identified above. Two relatively simple methods provide a measure of robustness to rotation without limiting the maximum possible displacement measurement, and two, somewhat more complicated methods, provide superior robustness to rotation and also have other advantages.

The first two methods provide the ability to measure large displacements while also incorporating some rotation and scale tolerance. Both methods rely upon limiting the shift estimation to information in a small area in the centre of the reference tile.

In all of the methods to be presented, robustness is achieved by processing a reference tile before shift estimation commences. Processing the reference tile has some advantages. For example if the tile is digitally generated, the tile can be noise-free, and the processing of the tile can be performed before a target image is acquired. If there is a substantial time delay between the reference image being available and the target image being available, the processing of the reference tile can be performed within the delay time, so that the processing of the reference tile need not add any real time to whatever task is being performed. However, there may be applications in which it is desirable to process the target tile instead.

In a first technique, pixels outside a central disk of predetermined radius in the reference tile are zeroed so that rotation within a specified range of angles, for example ±2°, will not shift any non-zero pixels by more than a single pixel. For small angles, the radius of this disk is inversely proportional to the sine of the rotation angle range. At 2° rotation, good results were obtained by the present inventors for a disk with a diameter of 28 pixels. The RMS shift estimation error for 128×128 tiles was approximately 1.24 pixels for the original reference tile, and approximately 0.09 pixels for the reference tile zeroed outside a central disk or predetermined radius. Note that it is common to pad tiles by an area of up to 75% before correlation to avoid a correlation signal from the tiles overlapping on the other side, which is caused because of the wraparound properties of the Discrete Fourier Transform.

For providing both good rotation robustness and large maximum shift estimation, such a disk will generally be padded to an area of larger than 75%.

In a second technique, the reference tile is multiplied by a windowing function which emphasizes pixels near the centre of the tile and reduces to zero the amplitude of pixels approaching the edge of the tile. Different windowing functions could be used, such as a Gaussian window or a Hanning window, and the best width for the windowing function can be determined empirically by performing shift estimation on tiles containing different image content with rotation angles which cover the desired range. At 2° rotation, the RMS shift estimation error for this second technique, again for 128×128 tiles, was approximately 0.10 pixels.

Both of these techniques are also effective for a small range of scaling factors, and for a range of aspect ratios, and by extension a continuum of arbitrary spatial transformations which are sufficiently close to an identity transformation.

While these methods produce an improvement in the shift estimation accuracy under spatial transformations, they have the undesirable property of removing or depreciating pixel information outside the centre of the reference tile. Where a spatial transform is purely translational in the presence of noise, shift estimation error can be inversely proportional to the width of the tile, thus larger reference tiles provide greater shift estimation accuracy. However, by zeroing or windowing pixels in the reference tile, the achievable accuracy is limited because the window size is limited by the angle range, not the reference tile width, so that increasing the reference tile size provides no increase in shift estimation accuracy.

It would be preferable to have a method in which alignment information could be preserved across the whole reference tile, with some rotation of the target tile not adversely affecting accuracy.

Presently disclosed is a further approach which provides for robust shift estimation under small spatial transformations which also substantially preserves image information outside the centre of the reference tile. This technique is referred to herein as the "brosc" method, being an abbreviation for "best rotation or scale", and will be presented as two methods formed respectively by a real brosc filter, and a complex brosc filter.

The brosc method relies on the fact that pixels close to the centre of rotation of a tile do not move substantially during rotation, other than the global shift, yet pixels further away from this centre move proportionally more, shifting by more than one pixel even with a small rotation angle. The method can work over a range of angles, and is initially calibrated to operate within a specified range of rotation angle ±α giving a total angle range of 2α°. For example, for one instance of the method α=3 and would operate for all angles θ between ±3°, giving a range of 6°.

During rotation through a range of angles, each pixel in a tile moves along the arc of the circle containing that pixel and with origin at the centre of rotation. At each pixel centre, this arc is orthogonal to the radius of the circle passing through that pixel, and the length of the arc is proportional to the distance of the pixel from the centre of rotation. For a pixel at position (x,y) relative to the centre of rotation (0,0), the radius vector is $v_r=(x,y)$, and the two unit vectors orthogonal to this radius are:

$$\tilde{v}_1 = \frac{(-y, x)}{\sqrt{x^2 + y^2}}$$

and $$\tilde{v}_2 = \frac{(y, -x)}{\sqrt{x^2 + y^2}}.$$

Using this knowledge of the motion of each pixel during rotation, a filtered reference tile can be created from the original reference tile as a template which provides better accuracy under shift estimation. The purpose of the filter is to create an image which will have a strong correlation at all rotation angles within the desired range. As such, the filter only warps in one dimension, even though application of the filter may be in a direction not aligned with an established or assumed dimension of the tile to which the filter is applied.

To achieve this effect, in a real brosc filter application, each pixel in the filtered image is replaced by the mean value of the pixels which intersect that pixel, or pixel location, through rotation by the angle range, the use of the mean value confining the determination to the real domain. During correlation with a rotated target image, the pixels in the filtered reference image will contain a partial match with every overlapping pixel in the target image. The effect of this real brosc filter is that correlation accuracy with the filtered image is smaller at 0° than with the unfiltered image, but correlation accuracy is much greater than the unfiltered image for rotation angles within the rotation range. When shift is measured by correlation between the filtered reference tile and the target tile, the correlation peak width remains consistently narrow across the whole range, and provides a good estimate of shift between the centre of rotation of the filtered reference tile and the corresponding location in the target image. If the centre of rotation used for the filter is in centre of the tile, then the correlation will accurately measure the distance between the centre of the filtered reference tile and the corresponding location in the target image.

For small angle ranges, for example of less than 10°, the arc through each pixel can be approximated by a straight line, or line segment, also passing through the pixel, orthogonal to the radius, and of length 2r sin α. A better approximation to the arc would be centred on a position slightly closer to the centre of curvature, but accounting for this effect provides negligible improvement.

Because the period of the Nyquist frequency is smaller than 2 pixels at angles other than 0° or 90°, the Nyquist sampling rate is less than 1 pixel at these angles, and the desired step between pixels to achieve proper sampling is the vector $$\left(\frac{-y}{|x|+|y|}, \frac{x}{|x|+|y|}\right).$$

The number of pixels in the filter to achieve the desired length is $(|x|+|y|)\cdot 2 \sin \alpha$. These vectors must be computed for every pixel position, but, fortunately, these calculations require only simple arithmetic, other than the length scaling factor sin α which is constant over the whole tile.

While stepping along the line segment to evaluate the filter, the desired sampling position is not usually an exact pixel position. In this case, the nearest pixel is used instead. A more complicated filter using interpolated pixel values instead of nearest pixel values could be used, but does not substantially improve the filter's effectiveness, and would substantially increase the time taken to calculate the filter.

Note that because the brosc filter is one-dimensional, the brosc filter attenuates high frequencies only in one direction at each tile position, leaving some high-frequency energy at all positions on the input tile, and thus retaining information required for good shift estimation.

Figure 1:
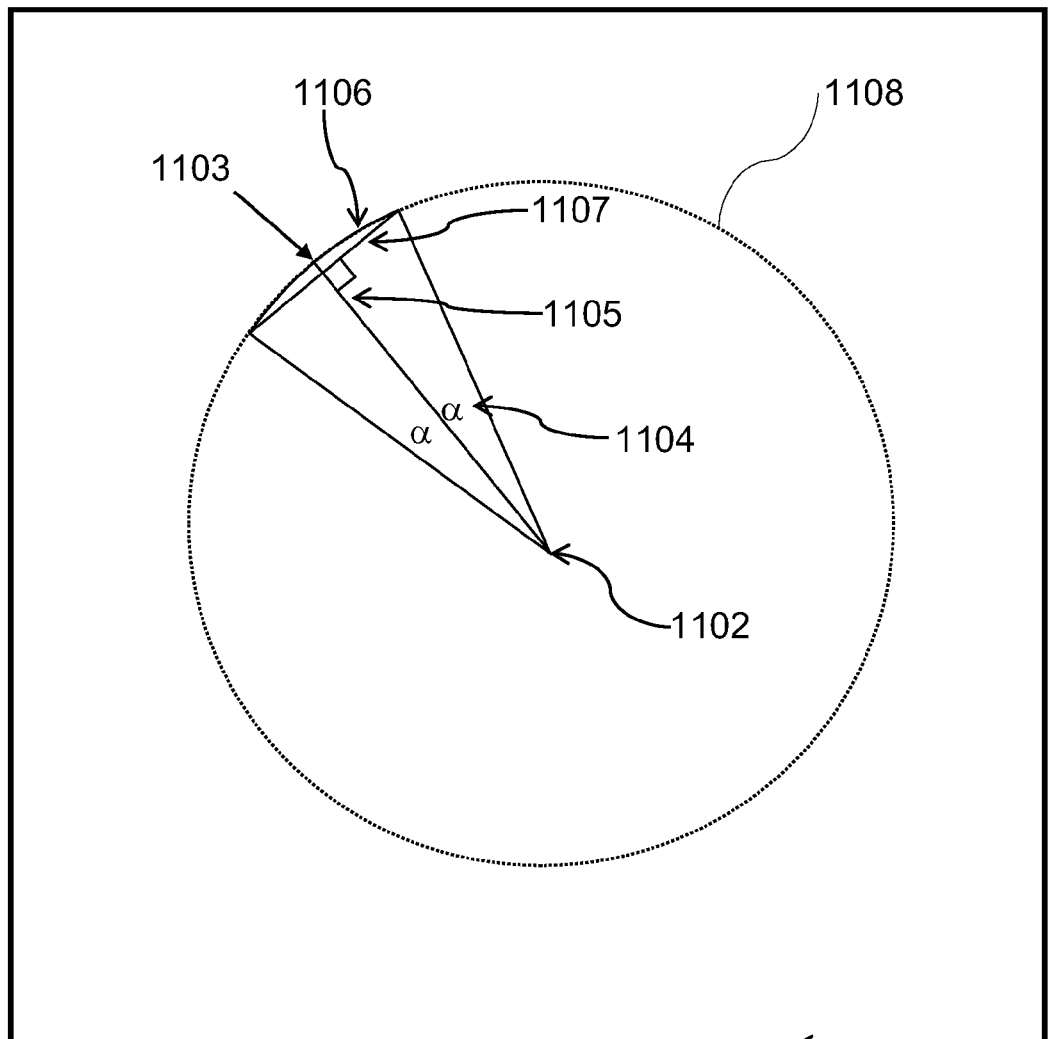
FIG. 1 shows the geometric arrangement of positions relating to the brosc filter used to assist with shift estimation with rotation.

FIG. 1 shows the geometrical configuration for the filtering of one pixel. FIG. 1 shows the reference 1101 tile to be filtered, having a centre of rotation 1102 of the filter, which in this case, corresponds to the centre of the reference tile 1101. The reference tile 1101 is typically a component of an image, for example temporarily stored in the memory 2206 of the computer 2201. FIG. 1 also shows the position 1103 of the pixel to be filtered, and the half-angle α 1104 which sets the filter angle range. Also illustrated is the radius 1105 from the centre of rotation to the pixel, a circle 1108 with the radius 1105 passing through the pixel 1103, the arc 1106 through which the pixel would move during rotation by the angle range, and 1107 shows the line segment 1107 which is an approximation to the arc 1106.

In summary, the one-dimensional spatially varying filter for rotation can be calculated using the following steps, which are preferably implemented as a software application stored for example in the HDD 2210 and executable by the processor 2205 with intermediate storage in the memory 2206:

1. Input is half-angle range α 1104, tile t(x,y) 1101 with centre of rotation (0,0) 1102;
2. Length scaling factor for one side s=sin α;
3. For each pixel t(x,y) 1103 in the input tile,
   a. Let start position $\tilde{p}=(x,y)$ 1103,
   b. Let sampling step $$\tilde{d} = \left(\frac{-y}{|x|+|y|}, \frac{x}{|x|+|y|}\right),$$

c. Let number of samples on one side of the filter n=round (s·(|x|+|y|)),
   d. Let sum of pixels along the line $a=\Sigma_{k=-n}^{n} t(\tilde{p}+k\cdot\tilde{d})$,
   e. Let the output pixel $$u(x, y) = \frac{a}{2n+1},$$

4. Output is filtered tile u(x,y) of the same size as the input tile.

The output filtered tile may be stored in the memory 2206 as part of a filtered image. Note that, when evaluating each output pixel, the filter uses pixels in the positions of previously-filtered pixels. Thus, it is necessary to store the output tile u in a separate memory buffer, in the memory 2206, from a memory buffer in the memory 2206 used to store the input tile t. Alternatively, the memory 2206 may be configured to operate partly as a strip buffer containing the current rows or columns being processed, which will allow the filter to be evaluated without allocating a separate tile buffer for u and t.

For angles between ±2°, which is a total angle range of 4°, this filter is very effective when used with a wider half-angle range of α=4°.

The use of this spatially-varying one-dimensional filter creates a modified reference tile which provides a more accurate reference for shift estimation using correlation. However, it does not provide any means for simultaneously measuring the rotation of the target tile relative to the reference tile.

A further enhancement of the specified filter can provide a way to estimate the rotation angle, thereby resulting in the complex brosc filter, introduced above. Note that if the filtered reference tile is correlated with a target tile which has been rotated by −2°, then the correlation will be strongest between the target tile and those components of the filter representing a rotation by −2°, which, if the total range of the filter is ±2°, will be those pixels at one extreme end of the filter. Each pixel in the filter represents an angle of rotation encoded by a complex phase. For example, if the total range of the filter is ±2°, we could assign a complex phase $\phi=-90°$, or $(0+i)$, for pixels rotated by −2°, $\phi=-45°$ for −1°, $\phi=0°$ for 0°, $\phi=45°$ for 1°, or $\phi=90°$ for 2°. If the filter at a specific pixel is one kernel pixel per degree, then this filter kernel is a linear phase of frequency 45° per pixel, with a phase range of 180° for rotation angles between ±2°. Because the number of pixels per degree changes according to the current radius of the filter, the frequency of the kernel will be inversely proportional to the radius, and the phase of the kernel directly proportional to the radius.

Because the filter kernel is complex, the filtered reference image is also complex, thus the shift-estimation correlation is complex instead of real. However, if the correlation is implemented using the Fast Fourier Transform (FFT), a complex correlation may be readily implemented since the FFT is a complex transform in any case.

After correlation, the rotation angle of the target tile is encoded in the complex phase of the correlation peak. In the example above, a rotation of the target tile by −2° should result in a complex correlation peak with a nominal complex phase of −90°, and for angles θ between −2° and 2°, a rotation by θ should result in a complex correlation peak with a nominal complex phase of 45θ°. For example, if the target tile was rotated by −1.5°, then the phase φ of the correlation peak will be approximately $\phi=-67.5°$. For several reasons, the expected correspondence between the rotation angle and the phase of the correlation peak is not exact. Firstly, because the frequency of the complex filter kernel is inversely proportional to radius, the uncorrected frequency of the filter kernel will be aliased near the centre of the tile. To prevent aliasing, the maximum frequency of the filter kernel is set to $$\frac{d\varphi}{dx} = 90°.$$

Secondly, near the centre of rotation of the tile, the kernel width will be too small to do any filtering at all, creating a bias towards purely real values, i.e. a phase of 0°.

The effect of these problems on angle estimation may be readily counteracted, as empirical observation shows that the problems approximately result in a linear scaling of the estimated correction angle. An empirical value may be derived to correct angle estimates from phase for a specified tile size. For example, for a 128×128 tile, the present inventors have determined that multiplying the phase estimate by 1.175 will produce more accurate results than using the theoretical value.

The phase range of the filter must also be chosen carefully. Noise will perturb the phase estimate, so that the phase range must be chosen to be large to keep the signal-to-noise ratio (SNR) high. However, a phase range as large as 360° cannot be used, because an ambiguity would be created: an angle of +2° corresponds to a phase of +180°, and an angle of −2°, corresponds to a phase of −180°, however these two phases are not distinguishable.

The best results have been obtained where the maximum frequency is restricted to be 90° degrees per pixel, and the phase range of the filter kernel set to 215°.

Table 1 shows some example results with the complex and real brosc filters compared with other methods. The test used five 128×128 sample tiles of different types: large text, dense text, smooth image, detailed image and mixed image/text. The tiles were processed to include several shifts up to ±25 pixels and angles between ±2°.

TABLE 1

| Filtering Method | RMS shift error at 0° (pixels) | RMS shift error at 2° (pixels) | Minimum Peak Magnitude (−2° . . . +2°) | Error in Angle Estimation (RMS °) |
|---|---|---|---|---|
| No Filtering | 0.005 | 1.24 | 0.115 | X |
| Zero Outside | 0.020 | 0.092 | 0.152 | X |
| Window Function | 0.024 | 0.095 | 0.164 | X |
| Real brosc | 0.043 | 0.069 | 0.241 | X |
| Complex brosc | 0.012 | 0.026 | 0.283 | 0.04° |

The results show that the complex brosc method is the most accurate over the whole angle range.

Complex brosc also has a larger minimum peak magnitude than the other methods, and thus is likely to be more robust than the other methods in the presence of noise and other image distortions.

Angle estimation is also quite accurate in the complex method, with an RMS estimation error of 0.04° for angles in the range ±2°. Only the complex brosc method gives an angle estimate, thus the other techniques are shown as 'X' in Table 1.

Where the alignment between the complex brosc-filtered patch and a target patch is already known, another advantageous method of estimating the angle of rotation is to sum the element-wise multiplication of a complex brosc-filtered patch with an appropriate target patch, or to sum the element-wise multiplication of a sub-region of a complex brosc-filtered patch with a sub-region of an appropriate target patch. The phase of the resulting complex value provides the rotation estimate, in the same manner as with the complex correlation method described above.

An appropriate target patch for multiplication and summation is one that contains the same or similar data as that sourced to create the brosc-filtered patch, but where the data has potentially been rotated. A target patch where only some of the data corresponds to data in the brosc-filtered patch can also be used, by restricting the multiplication and summation to the sub-regions of the target patch and the brosc-filtered patch containing, or sourced from, the same or similar data. Note that the sub-regions may be at different offsets within the two patches. Also, corresponding elements for element-wise operations are those with the same relative offset within each sub-region (but not necessarily the same offset within the whole patch). Similarly, the angle can be estimated by summing the element-wise multiplication of a target patch where only some of the data corresponds to data in the brosc-filtered patch, when the corresponding data is located at the same or similar offsets within both the target and brosc-filtered patches. In this case, the non-corresponding data is ideally, but not necessarily, zeros in either the target patch or the brosc-filtered patch. Obtaining appropriate brosc-filtered and target data will be described in more detail later, with reference to FIGS. 15, 17 and 18.

An advantage of using this technique over complex correlation for rotation estimation is computational speed. Calculating the sum of an element-wise multiplication of two patches is many times faster than calculating the correlation of the same sized patches, using either real or complex correlation.

For applications where no shift between images is expected, rotation can be estimated by multiplying and summing patches extracted from the same location within each image. For applications where there is a known shift between images, rotation can be estimated by multiplying and summing patches extracted from the images at locations offset from one another at or close to that shift.

For applications where the shift between images is not otherwise known, a shift estimation technique can be used to find appropriate patches for applying the multiply-and-sum technique for estimating image rotation. Shift-estimation techniques described elsewhere in this disclosure can be used. Suitable alternative shift-estimation techniques are also known in the prior art.

One useful approach is to estimate the shift by correlation with a real version of a brosc-filtered patch. Correlation between two real-valued patches can be implemented using approximately half the number of operations as correlation with complex-valued patches, and can therefore be calculated in approximately half the time. As the time to calculate the sum of the element-wise multiplication of two patches is typically a fraction of the time of a correlation, a real-valued correlation (for shift estimation) followed by a complex-valued element-wise multiplication and summation (for rotation estimation) can be calculated in close to half the time as a complex correlation. This approach will be discussed later in this disclosure, with reference to FIG. 16.

A disadvantage of this approach is real-valued shift estimation may be less accurate than complex-valued estimation. Also, if the shift contains a sub-pixel component, the multiply-and-sum rotation estimation may be less accurate than that calculated by complex correlation. A way of mitigating the latter inaccuracy is by pre-computing sub-pixel-shifted versions of the complex brosc-filtered patch, and choosing the closest patch for rotation estimation. This technique will be elaborated on later, with reference to FIG. 15.

Elsewhere in this disclosure, brosc methods are described for estimating transformations other than rotation; examples include scaling, shearing, and barrel distortions. The multiply-and-sum methods described above, in the context of rotation estimation, can also be used for estimating a parameter of the other types of transformations. For example, if a brosc-filtered patch is created that encodes scaling the in X direction, the complex phase resulting from summing the element-wise multiplication of that patch with an appropriate target patch provides an X scaling estimate.

While the description herein of the multiply-and-sum technique for transformation parameter estimation uses a complex-valued tile, where the complex phase encodes a particular transform, it should be clear to those skilled in the art that other similar or equivalent encodings could be used, such as encoding the transform in a patch of 2-dimensional vector elements, or across two separate real-valued patches. Likewise, while summation is preferably used to aggregate the multiplied elements, other aggregation methods may also yield useful results.

While the brosc method often works to improve shift estimation accuracy and estimate rotation angle, there are some cases in which correlation or angle estimation can fail after applying the brosc filter. Two extremely common examples are: a simple corner, with one block colour in three quarters of the tile, and a different block colour in the remaining quarter; and a corner of two lines meeting at 90°. In both cases, all of the gradients in the tile are parallel to the one-dimensional (1d) filters applied to the tile, and are hence strongly filtered, and there are no gradients orthogonal to the filters. The brosc filter is one dimensional and whilst the filter may be applied at different orientations about the tile, the filter blurs only in the one dimension of application.

In this case, much of the high-frequency content of the tile is destroyed by the filter, resulting in possible failure of the correlation.

Cases such as this one can be detected by computing the energy of the gradient in directions both parallel to, and orthogonal (perpendicular) to, the radii of the reference tile before the brosc filter is applied. The energy computation can be performed by calculating the sum of squares of the dot product of each gradient vector with both a unit vector parallel to the radius, and also orthogonal to the radius. A tile is likely to be a problem case if the ratio of the orthogonal energy to the parallel energy is smaller and/or larger than predetermined threshold values. Suggested values for the ratio threshold, as determined through experimentation by the present inventors, are 0.33 as a minimum allowable ratio, and 3.00 as a maximum allowable ratio.

If a potentially problematic tile is detected, then a new location should be chosen for the centre of the tile. One approach is to shift the measurement position of the tile one quarter of the width of the tile in a direction towards the half-plane containing the most gradient energy, where the half planes are evaluated at the eight points of the compass.

Figure 2:
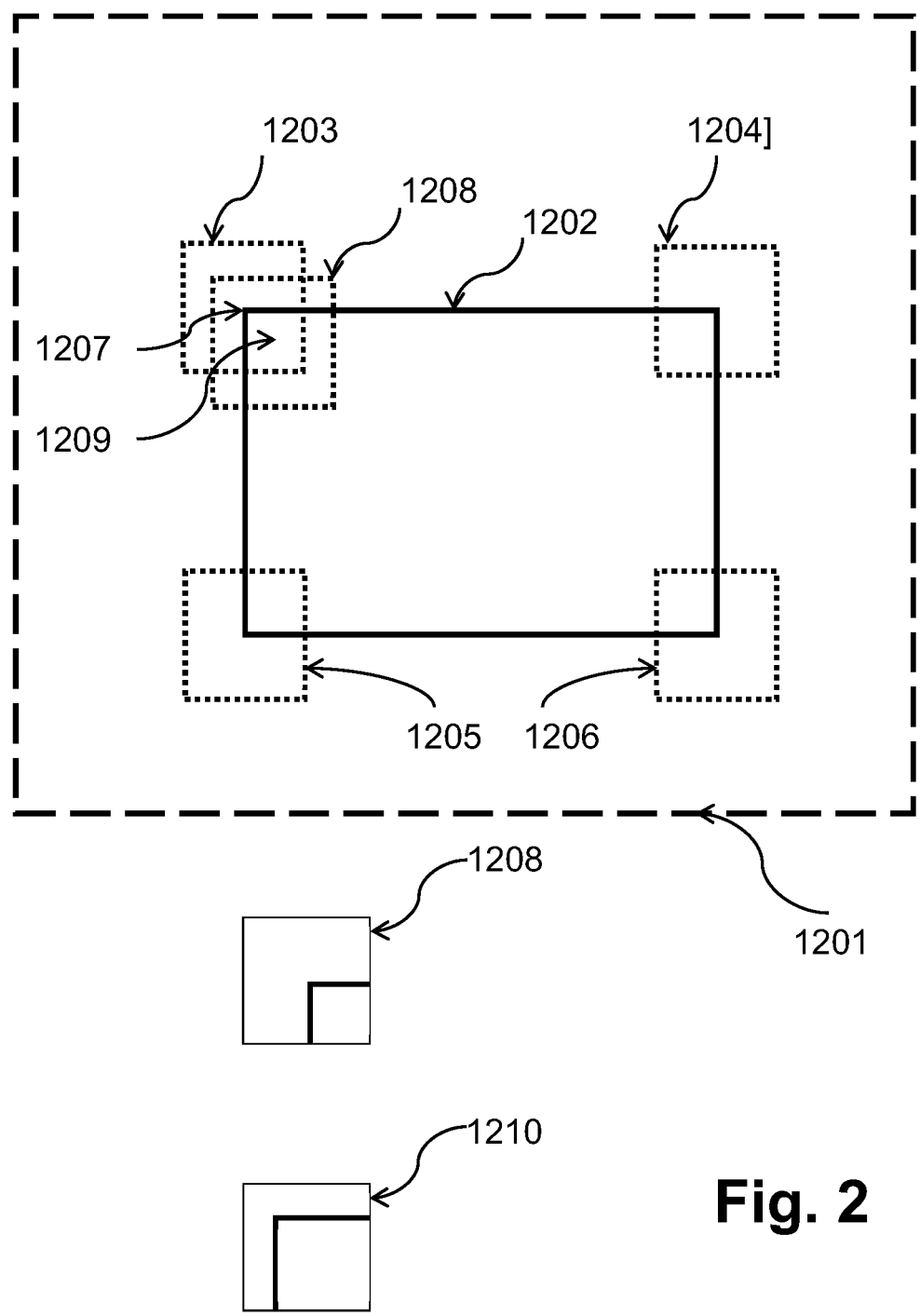
FIG. 2 shows reference tiles chosen within an image for shift estimation, and how these reference tiles are shifted to avoid inaccuracies.

An example showing how this shift can be effected is shown in FIG. 2.

FIG. 2 shows a reference image 1201 to be processed in preparation for comparison against a target image. The reference image 1201 includes an empty rectangle with a black outline 1202, on a white field or background. A patch selection process is applied to the reference image 1201 to identify a selection of tiles 1203, 1204, 1205 and 1206 containing good two-dimensional alignment features which can be used for shift estimation.

However, each tile 1203, 1204, 1205 and 1206 contains a corner of the rectangle 1202 at the corresponding centre, and so is potentially problematic, containing very little gradient energy in a direction parallel to the brosc filter kernels.

The position of each tile 1203, 1204, 1205 and 1206 should desirably be shifted to yield a new measurement position.

The tile 1203 is shown separately as tile 1208, with a measurement position 1207, this corresponding to the centre of the tile 1203. The half plane with the largest gradient energy is in the south-east half plane, so that the measurement position should be shifted one quarter of the tile width to the south-east, yielding a new tile position 1208, with centre 1209, and shown as a tile 1210.

As each of the tiles 1203, 1204, 1205 and 1206 contain corner features, they should all be processed similarly, resulting in a shift of each tile to the south-east, south-west, north-east and north-west respectively.

The brosc filter may also be used where a target tile is scaled within a small range, for example ±2%, instead of rotated. However, instead of applying the filter in a direction tangential to a circle around the centre of rotation, the filter is applied in a direction parallel to a radius from the fixed point of the scaling.

Figure 4:
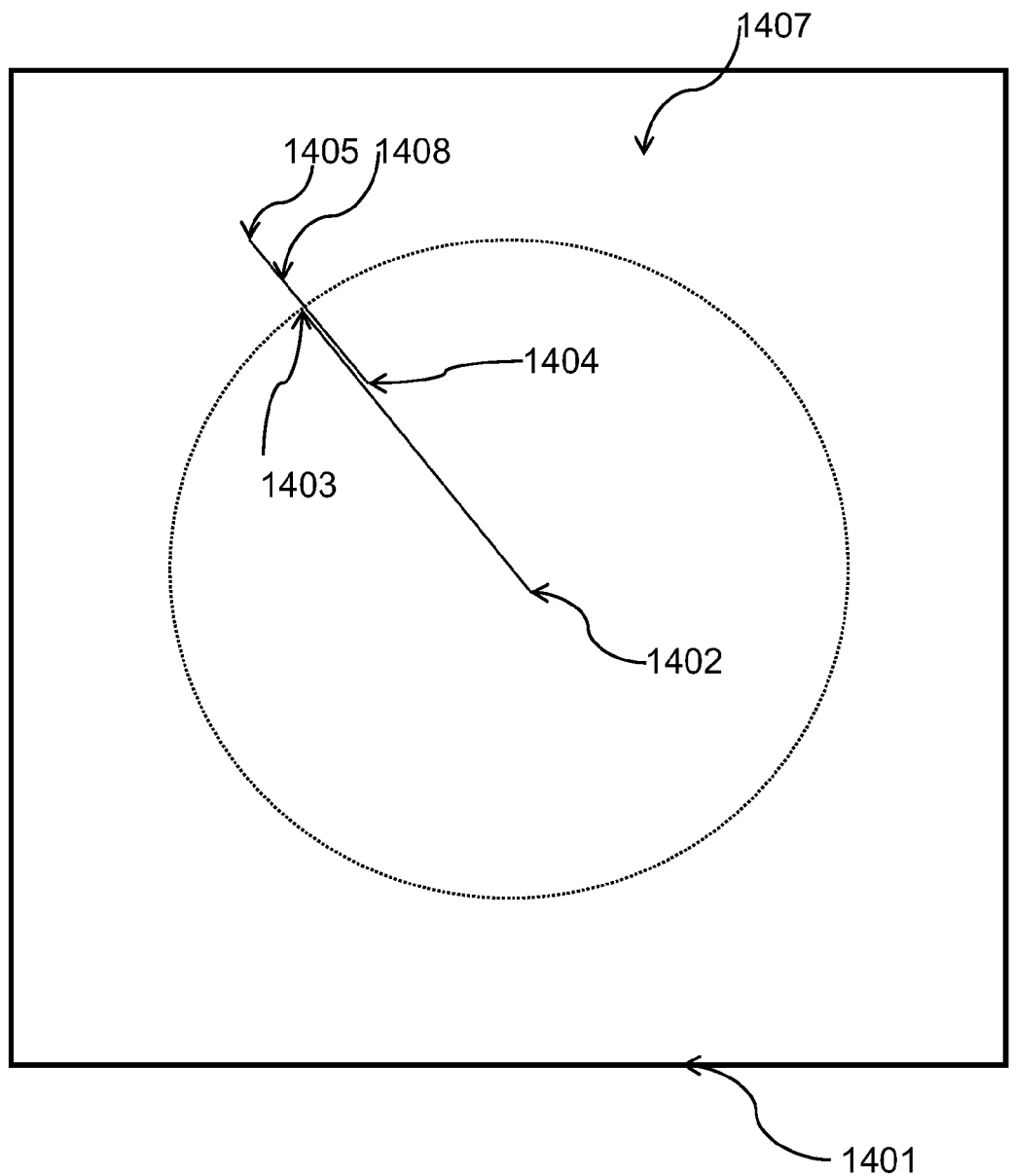
FIG. 4 shows the geometric arrangement of positions relating to the brosc filter used to assist with shift estimation with scaling.

FIG. 4 shows the geometrical configuration for the filtering of one pixel for scale robustness. In FIG. 4, a reference tile 1401 to be filtered is shown which has a centre of scaling 1402, which in this case is in the centre of the reference tile 1401. A position of a pixel 1403 to be filtered together with the minimum position 1404 and maximum position 1405 corresponding to the minimum and maximum scaling factors respectively, and a circle 1406 passing through the pixel 1403 to be filtered. A line segment 1408 is shown to indicate the positions to which pixel 1403 would move to during scaling.

The one-dimensional spatially varying filter for scaling can be calculated using the following steps, which are preferably implemented in software executable upon the computer 2201 as before:

1. Input is scaling factor range s %, tile t(x,y) 1401 with centre of rotation (0,0) 1402;
2. For each pixel t(x,y) 1403 in the input tile,
   a. Let Start position $\tilde{p}$=(x−s %,y−s %) 1405,
   b. Let End position $\tilde{q}$=(x+s %,y+s %) 1406
   c. Let sampling step $$\tilde{d} = \left(\frac{x}{|x|+|y|}, \frac{y}{|x|+|y|}\right),$$

d. Let $\alpha = \Sigma_{k:\tilde{p} \leq \tilde{p}+k\cdot\tilde{d} \leq \tilde{q}} t(\tilde{p}+k\cdot\tilde{d})$,
   e. Output pixel and $$u(x, y) = \frac{a}{\text{MAX}(k+1)};$$

3. Output is filtered tile u(x,y) of the same size as the input tile.

As with the filter for the rotation case, a linear phase function can be used as the kernel coefficients, with the phase of the resulting correlation peak being a function of scaling factor. It may also be necessary to check for tiles which contain corners or circular features by calculating the ratio of tangential and radial gradients.

Aside from rotation and scaling, the brosc method can be modified to improve shift estimation and estimate transformation parameters for any set of spatial transformations in which pixels locally move substantially along a line. Examples of other such transformations are a perspective projection incorporating rotation around a single axis, aspect ratio change, barrel and/or pincushion distortions, or image shearing.

A general method can be described for calculating a brosc filter for any spatial transformation which is varied in one parameter only, and in which the motion of individual pixels is approximately along a line. Both the scaling and the rotation methods can be expressed in this form, along with many others.

Figure 6:
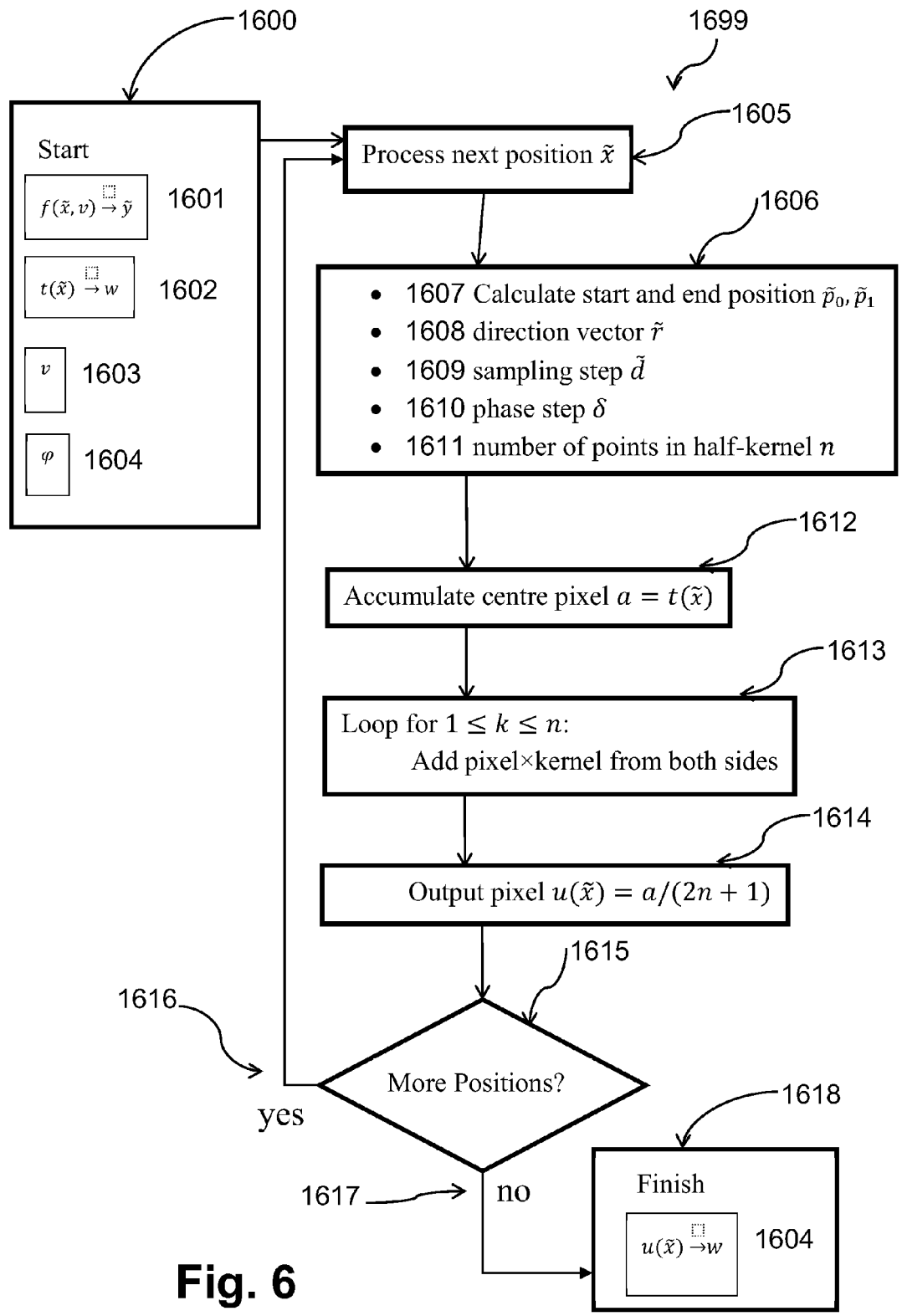
FIG. 6 shows a flowchart of a method for filtering a tile to support robust correlation given any spatial transformation taking a single parameter.

The operation for this general brosc method is shown by a method 1699 in FIG. 6 which also may be implemented in software executable upon the computer 2201, and begins with four inputs 1600.

1. Input 1 1601 is a spatial transformation $f(\tilde{x},v) \rightarrow \tilde{y}$ which maps a position $\tilde{x}$ to a position $\tilde{y}$ using a transformation taking a single real parameter v, where for v=0 the transformation is the identity transformation, $f(\tilde{x},0)=\tilde{x}$.

For example, f may rotate the point $\tilde{x}$ by a rotation angle v, and f may scale the point $\tilde{x}$ by a scaling factor (1+v), or f it may apply perspective by giving a point projected to a view plane after a rotation around the x-axis by a rotation angle v. It is better if the transform is approximately symmetrical, i.e.

$$f(\tilde{x},v) - \tilde{x} \approx \tilde{x} - f(\tilde{x},-v)$$

2. Input 2 1602 is a tile or image $t(\tilde{x}) \rightarrow w$;
3. Input 3 1603 is a parameter range v for the parameter, v>0;
4. Input 4 1604 is a phase range $\phi$ for the kernel, $0 \leq \phi < \pi$;
5. The method 1699 then prepare to process next position $\tilde{x}$ in input tile, in step 1605;
6. Step 1606 then calculates parameters for the brosc filter:
   a. Step 1607 sets the start position $\tilde{p}_0 = f(\tilde{x},-v)$, and the end position $\tilde{p}_1 = f(\tilde{x},+v)$
   b. Step 1608 sets direction vector $$\tilde{r} = \frac{\tilde{p}_1 - \tilde{p}_0}{2}$$

c. Step 1609 sets the sampling $$\tilde{d} = \left(\frac{\tilde{r}}{|\tilde{r}_x|+|\tilde{r}_y|}\right)$$

d. Step 1610 sets the phase $$\delta = \frac{\varphi|\tilde{r}|}{|\tilde{d}|}$$

e. Step 1611 sets the number of points in half-kernel $$n = \left\lfloor \frac{|\tilde{r}|}{|\tilde{d}|} \right\rfloor$$

7. Step 1612 then sets the accumulator value to $\alpha = t(\tilde{x})$;
8. For $1 \leq k \leq n$, step 1613 then sums filtered values into accumulator (complex)

$$a \leftarrow a + \sum_{k=1}^{n} t(\tilde{x}+k\cdot\tilde{d}) \cdot e^{ik\delta} + \sum_{k=1}^{n} t(\tilde{x}-k\cdot\tilde{d}) \cdot e^{-ik\delta}$$

9. Step 1614 then outputs pixel (complex)

$$u(\tilde{x}) = \frac{a}{2n+1};$$

10. At step 1615, if there are more positions (1616), the method 1699 returns to step 1605 (5. above);

11. If there are no more positions (1617), then at step 1618, the method 1699 outputs filtered tile u.; and 12. The method 1699 then finishes at step 1619.

Figure 3:
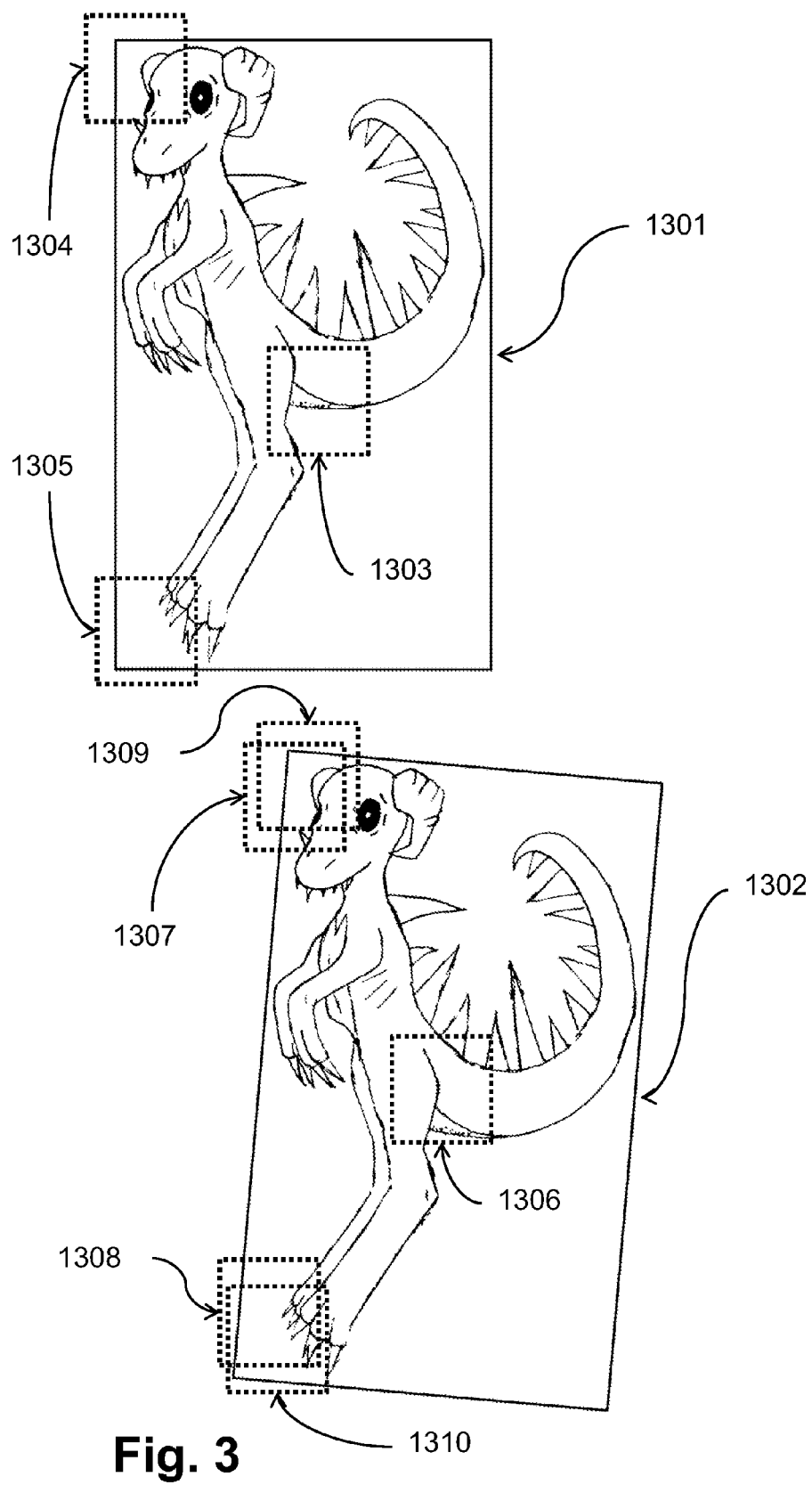
FIG. 3 shows reference tiles chosen within a reference and a target image of a dinosaur to be used to estimate shift, and how a first estimate of rotation angle improves subsequent shift estimates.

FIGS. 15A to 15D shows the result of performing the brosc filter on two example images, a grid of dots 1501 of FIG. 5A, and a tile 1507 of FIG. 5C from the dinosaur image of FIG. 3. Note that this example does not include the windowing and high-pass filter which would normally be applied along with the brosc filter.

FIG. 5B shows the result 1502 of applying the brosc filter to the grid of dots 1501. Note that although the filter kernel is applied along a line, the filtered image converts points into arcs. This occurs because the pixels containing kernels which intersect a given pixel occur on an arc which approximates the desired kernel shape, which is itself an arc. Near the centre of the tile, the filter is short and so the arcs are short, and near the edge of the tile, the filter is longer and correspondingly the arcs are longer.

FIG. 5D shows the result 1508 of applying the brosc filter to a tile 1507 from the dinosaur image. Again, note that near the centre of the tile, the filter is short and does not change the image substantially, and near the edge of the tile, the filter is longer and changes the tile substantially. However, note that although the image is blurred in the direction of the filter, there is still high-frequency alignment information in a direction orthogonal to that of the filter.

If the complex brosc filter is used, then the kernel values will be complex. In the grid point example of FIGS. 5A and 5B, the point at position 1503 is spread by the complex filter kernels between positions 1505 and 1506. The filtered position 1504 contains a contribution from very close to position 1503 multiplied by the centre of the complex filter in which the phase is zero, and the kernel value real and positive. Position 1505 contains a contribution from one end of the complex kernel, in which the phase is at a minimum, and position 1506 contains a contribution from position 1503 multiplied by the other end of the complex kernel, in which the phase is at a maximum and opposite in sign to that at position 1505.

Figure 19:
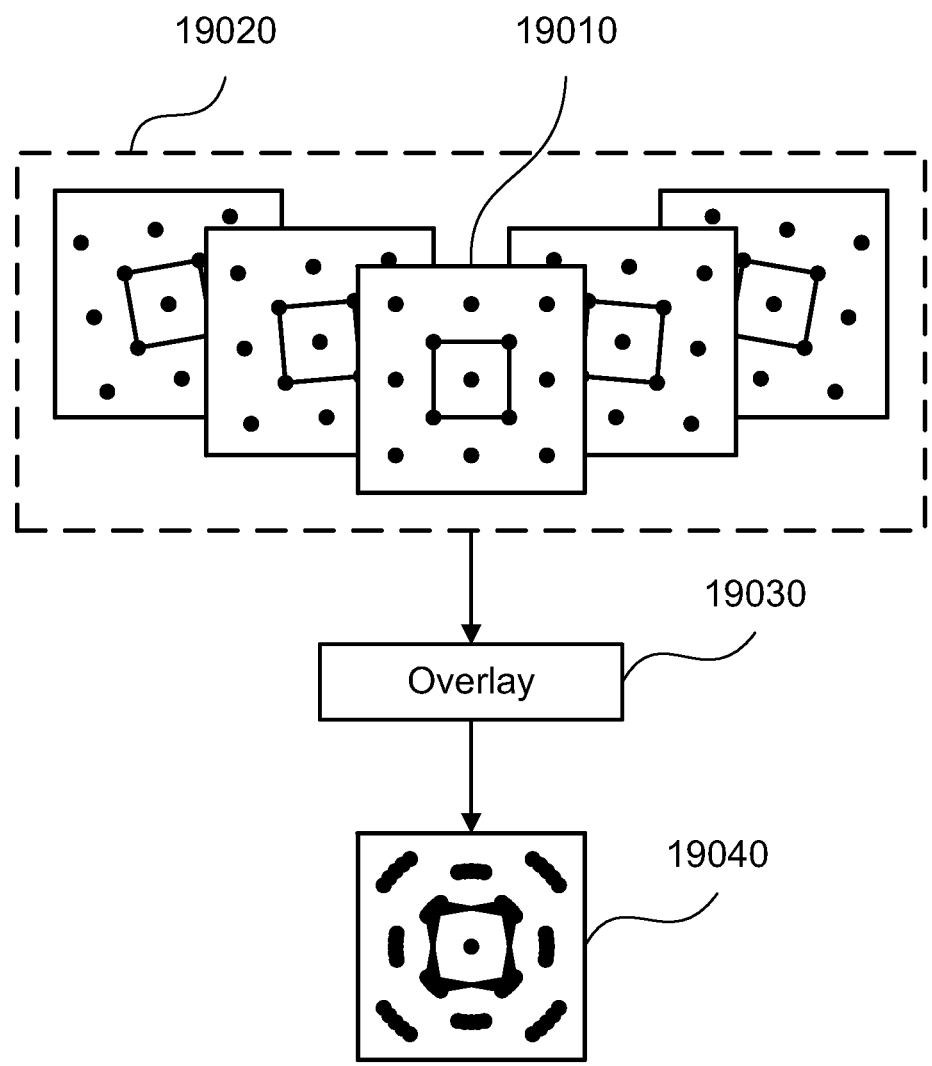
FIG. 19 shows a schematic flow diagram of a method for creating a brosc-filtered tile by overlaying transformed tiles.

An alternative method of producing brosc-filtered tiles is now described, with reference to FIG. 19. Instead of applying a spatially-varying 1-D filter at each position in a tile, as described in method 1699 and FIG. 6, a set of tiles are created, each transformed from a starting tile by a spatial transform taking a single real parameter. These tiles are then overlaid, preferably by averaging them, to create a brosc-filtered tile.

A suitable spatial transformation is one that can be described as $f(\tilde{x},v) \rightarrow \tilde{y}$, which maps a position $\tilde{x}$ to a position $\tilde{y}$ using a transformation taking a single real parameter $v$, where for $v=0$ the transformation is the identity transformation, $f(\tilde{x},0)=\tilde{x}$. As before, f can describe various operations, including rotating the point $\tilde{x}$ by a rotation angle $v$ and scaling the point $\tilde{x}$ by a scaling factor $(1+v)$.

The process for creating a set of spatially transformed tiles is preferably implemented in software executable on the computer 2201. There are several ways an implementation can transform a tile according to a given spatial transform $f(\tilde{x},v) \rightarrow \tilde{y}$. One way is to map all pixels in the source tile to locations in the destination tile using the spatial transform, and interpolate the results. Another way is to use an inverse mapping, where all pixels in the destination tile are mapped from locations in the source tile using the inverse of the spatial transform. For some transforms, multi-step approaches may be suitable. For example, rotations can be implemented as a shear in the X direction followed by a shear in the Y direction.

FIG. 19 illustrates an example brosc-filtered tile 19040 created from a collection of spatially transformed tiles 19020. Starting tile 19010 is transformed according to a spatial transform f in n discrete steps of its parameter v, where $v_{max}$ is half the transform range and $-v_{max} \leq v \leq +v_{max}$. This results in a collection of n transformed tiles 19020 (including the original tile 19010, corresponding the identity transform). The brosc-filtered tile 19040 is calculated at the overlay step 19030 by an element-wise average of the collection of tiles 19020. The number of discrete transform steps n is preferably chosen to avoid aliasing, based on the size of the tile to transform 19010 and the type of spatial transform f.

If the transformed tiles are all real-valued, averaging the transformed tiles results in a real-valued brosc-filtered tile. To create a complex-valued brosc-filtered tile, the transform parameter is encoded by multiplying each tile by a different unit complex number of phase $\phi$, where $\phi$ is varied in n discrete steps that correspond to the steps of the transform parameter v, $\phi_{max}$ is half the phase range and $-\phi_{max} \leq \phi \leq +\phi_{max}$. This parameter encoding can occur either before or during the overlay step 19030. Note that the tiles generated by this method will be similar to, but generally not identical to, those generated by method 1699. This is largely due to the varying number of samples using in creating each pixel of the tile returned by method 1699.

Figure 7:
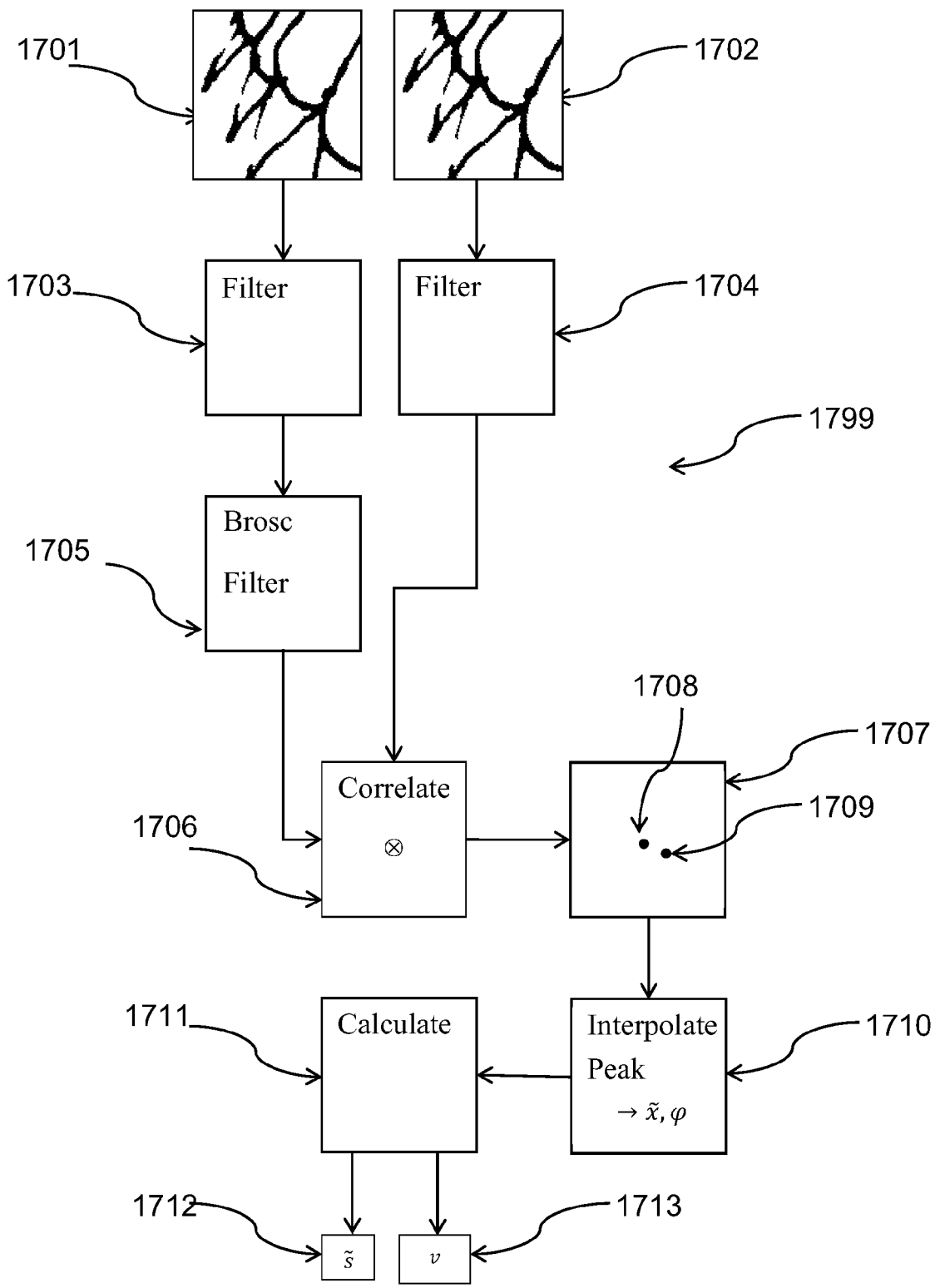
FIG. 7 shows a flowchart of a method for measuring both shift and one of rotation, scaling or other transform using a brosc filter.

FIG. 7 shows a method 1799 of how the brosc filter can be used in shift estimation of a tile and measuring one parameter of a spatial transform. The method 1799 is equally applicable to measuring images and, as before, is preferably implemented as software executable on the computer 2201.

1. In FIG. 7, 1701 is the input reference tile, and 1702 is the input target tile.

2. Both tiles 1701 and 1702 are filtered 1703 and 1704 respectively by removing low frequencies and hedging the edges of the tiles, as described previously.

3. Next, a brosc filter is applied at step 1705 to the filtered reference tile.

4. The two filtered tiles are correlated at step 1706, using direct correlation, phase correlation, and using the Fast Fourier Transform if appropriate for efficiency, to yield a correlation image 1707 with origin Õ 1708.

5. A correlation peak 1709 is identified in the correlation image 1707 by finding the maximum value thereof.

6. Next, the structure of the correlation peak is estimated at step 1710 to a sub-pixel position by examining a neighbourhood of the correlation peak 1709, interpolating to estimate a peak position $\tilde{x}$, and estimating the complex phase $\phi$ at that peak position.

7. From the measured peak position $\tilde{x}$ and complex phase $\phi$, step 1711 calculates an estimated shift 1712 $\tilde{s}=\tilde{x}-\tilde{O}$, and the parameter of the one-dimensional transform 1713 $v=K \cdot \phi$, where K is a constant calculated to minimize the error in v for the parameters used to calculate the brosc filter, including the tile size, the phase range, the parameter range, and the type of spatial transform.

FIGS. 13 to 18 show alternative methods using the brosc filter for shift estimation of a tile and for measuring one parameter of a spatial transform.

Figure 13:
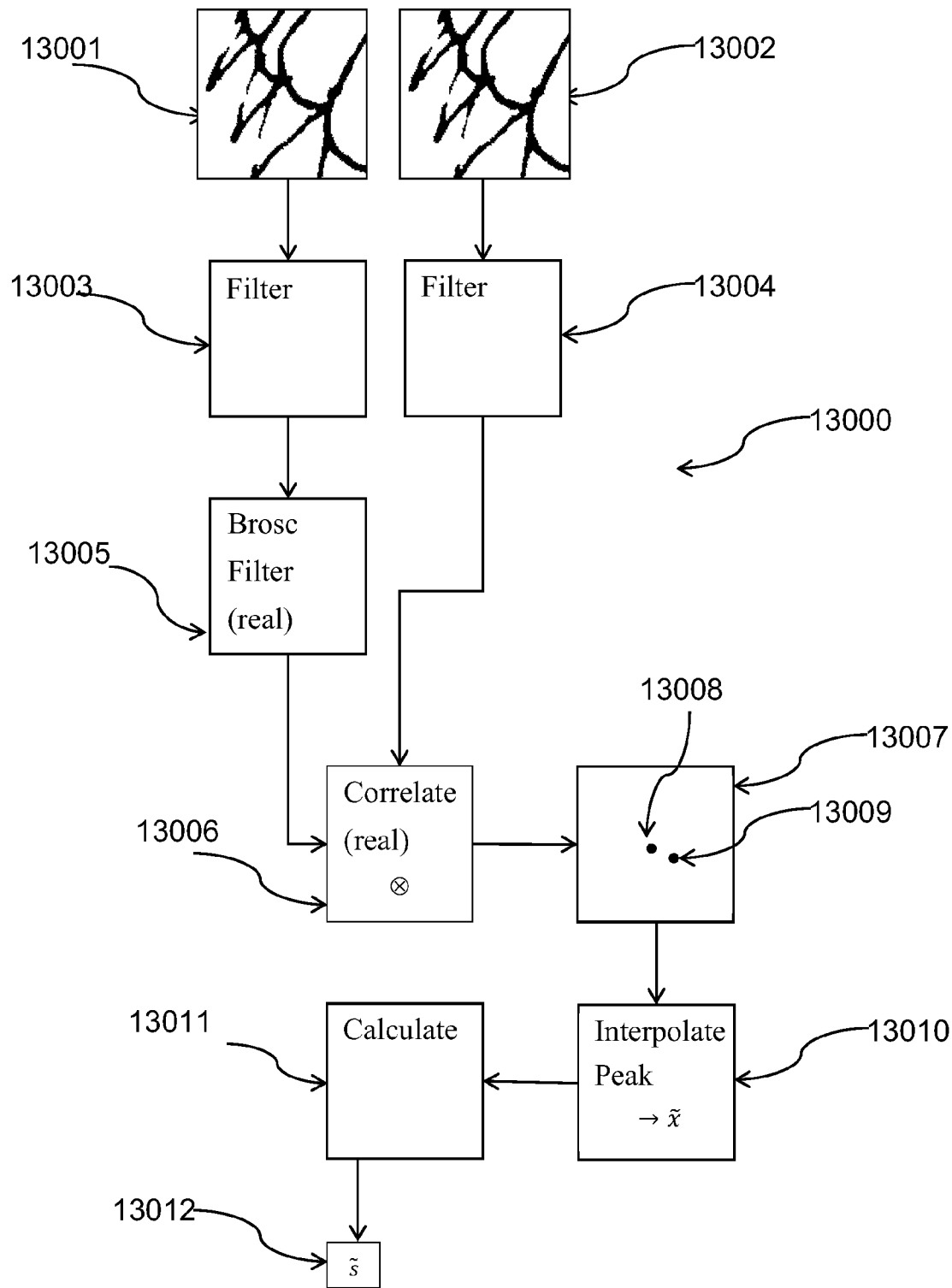
FIG. 13 shows a flowchart of a method for measuring shift in the presence of rotation, scaling or other transform using a brosc filter.

FIG. 13 shows a method 13000 for using a real-valued brosc filter for shift estimation of a tile. Method 13000 is similar to the method 1799; however, in the method 13000 real correlation is used instead of the complex correlation used in the method 1799. Thus, method 13000 on its own is only suitable for shift estimation. Parameter estimation requires additional steps, such as those of methods 14000 and 15000. The method 13000 is equally applicable to measuring images and, as before, is preferably implemented as software executable on the computer 2201.

1. In FIG. 13, 13001 is the input reference tile, and 13002 is the input target tile.

2. Both tiles 13001 and 13002 are filtered 13003 and 13004 respectively by removing low frequencies and hedging the edges of the tiles, as described previously.

3. Next, a real brosc filter is applied at step 13005 to the filtered reference tile, creating a real-valued brosc-filtered tile. As a part of step 13005, or as part of filtering step 13003 or 13004, further filtering may be applied to emphasise some regions of a tile over others. For example, the brosc-filtering may include reducing the amplitude of each pixel based on the length of the brosc-filter at that pixel, with the longest lengths resulting in the greatest reduction (as they carry the least correlation information).

4. The two filtered tiles are correlated at step 13006, using a correlation method such as phase correlation, and using the Fast Fourier Transform if appropriate for efficiency, to yield a correlation image 13007 with origin $\tilde{O}$ 13008.

5. A correlation peak 13009 is identified in the correlation image 13007 by finding the maximum value thereof.

6. Next, the structure of the correlation peak is estimated at step 13010 to a sub-pixel position by examining a neighbourhood of the correlation peak 13009 and interpolating to estimate a peak position $\tilde{x}$.

7. From the measured peak position $\tilde{x}$, step 13011 calculates an estimated shift 13012, $\tilde{s}=\tilde{x}-\tilde{O}$.

Figure 14:
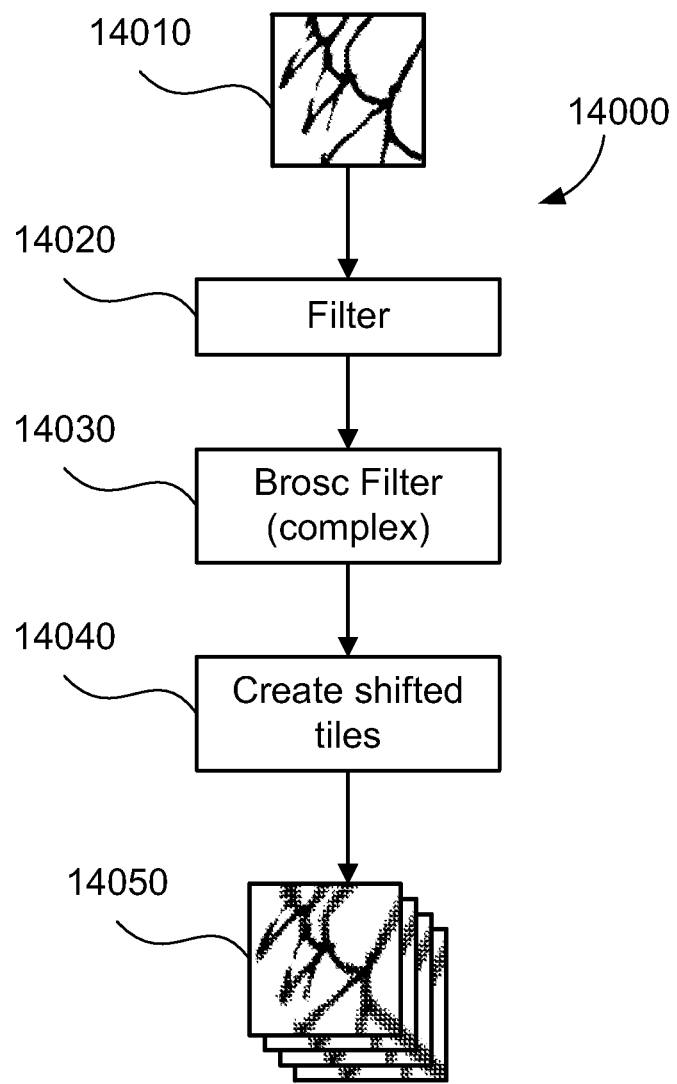
FIG. 14 shows a flowchart of a method for creating a set of brosc-filtered tiles.
Figure 15:
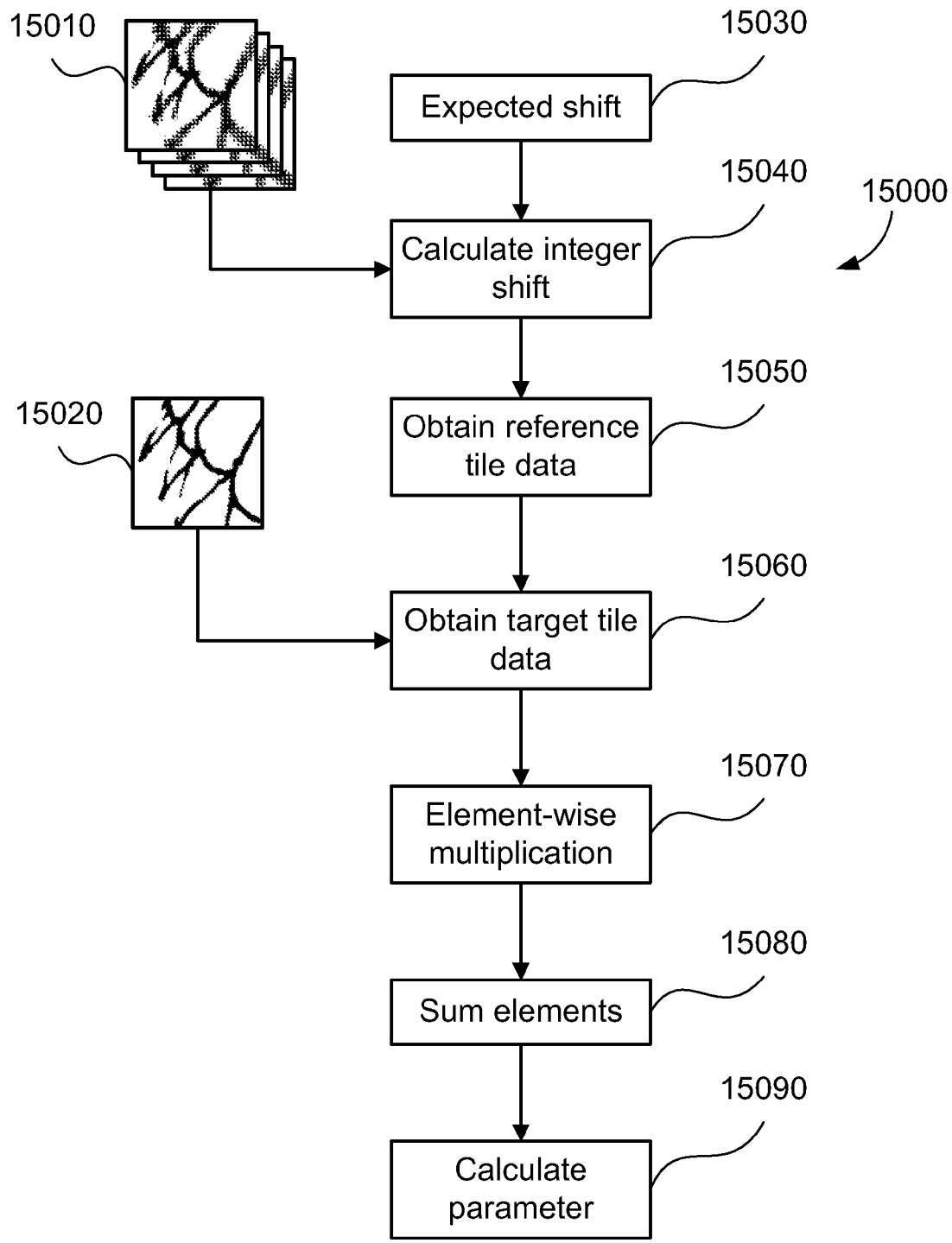
FIG. 15 shows a flowchart of a method for measuring one of rotation, scaling or other transform using a brosc filter.

FIG. 14 shows a method 14000 for producing a brosc-filtered tile, or collection of tiles, suitable for use with parameter estimation methods such as method 15000 from FIG. 15. The method 14000 is preferably implemented as software executable on the computer 2201.

1. In FIG. 14, 14010 is the input reference tile.

2. Tile 14010 is optionally filtered 14020 by removing low frequencies and hedging the edges of the tiles, as described previously. Note that the filtering applied here need not be the same as for a tile intended to be used for correlation.

3. Next, a complex brosc filter is applied at step 14030 to the filtered reference tile, creating a complex-valued brosc-filtered tile. As a part of this step 14030, or as part of filtering step 14010, further filtering may be applied to emphasise some regions of a tile over others. For example, the brosc-filtering may include reducing the amplitude of each pixel based on the length of the brosc-filter at that pixel, with the shortest lengths resulting in the greatest reduction, as they carry the least parameter-encoding information.

4. Step 14040 is optional. Step 14040 creates a number of copies of the brosc-filtered tile produced at step 14030, where each tile has undergone a sub-pixel (fractional) shift in one or both dimensions. For example, to cover sub-pixel shifts from the set {0.0, +0.25, −0.25, −0.5} in each dimension and in all combinations, step 14040 will result in 16 tiles. Generally, the smaller the sub-pixel step size used (and hence the larger the number of tiles produced), the more accurately methods such as the method 15000 from FIG. 15 can estimate the encoded spatial parameter when supplied with tiles produced by 14040. High quality sub-pixel-shifted copies of the brosc-filtered tile can be produced by use of the Fourier Transform in combination with an applied linear phase, or by using a high-quality sinc filter in the spatial domain. The tiles produced by step 14040 may be optionally cropped, which allows larger tiles to be used in earlier steps of method 14000, to provide more data for producing good shifted tiles.

5. 14050 is the output of method 14000: a collection of complex brosc-filtered tiles produced either by optional step 14040 or directly by step 14030 (if step 14040 is not performed). Each tile in the set is substantially the same brosc-filtered tile, but with each shifted by a different sub-pixel amount (including zero). Each tile is also associated with the amount of shift that produced it. If 14040 was skipped, 14050 will be a single brosc-filtered tile, implicitly associated with a zero sub-pixel shift.

FIG. 15 shows a method 15000 of using the brosc filter to measure one parameter of a spatial transform of a tile. The method 15000 is equally applicable to measuring images and, as before, is preferably implemented as software executable on the computer 2201.

1. An input into method 15000 is a one or more complex brosc-filtered tiles 15010, each associated with a sub-pixel shift. Such a tile, or collection of tiles, are preferably produced by method 14000, shown in FIG. 14.

2. Another input into method 15000 is a target tile 15020. If method 15000 is used to estimate shifts between images, this input could instead be a region within a target image.

3. Another input into method 15000 is the expected shift 15030 from one of the input brosc-filtered tiles 15010 (typically, the brosc-filtered tile associated with zero sub-pixel shift) to the target tile 15020, or similarly, a region within a target image. In some applications, the expected shift 15030 may be a known value, such as zero. In other applications, the expected shift 15030 may have been estimated by a method such as 13000 from FIG. 13.

4. In step 15040, an integer version of the expected shift 15030 is calculated. This is preferably calculated using both the expected shift 15030 and information on the sub-pixel shifts associated with the brosc-filtered tiles 15010. If the sub-pixel shifts are evenly spaced, this information may include the step size (distance) between adjacent sub-pixel shifts, or the number of sub-pixel shifts in each dimension.

Preferably, an integer shift is calculated so that the difference between the integer shift and the expected shift 15030 is as close as possible to one of the sub-pixel shifts associated with brosc-filtered tiles 15010. For evenly spaced sub-pixel shifts, this can be calculated by multiplying the shift in each dimension by the number of sub-pixel shifts in the same dimension, rounding the result to the nearest integer, dividing the rounded result by the same number of sub-pixel shifts, then rounding the divided result to the nearest integer. For example, if the brosc-filtered tiles are associated with sub-pixel shifts from the set {0.0, +0.25, −0.25, −0.5} in each dimension and in all combinations (four evenly-spaced shifts in each dimension), and the expected shift is (+7.4, −2.2), the preferred integer shift is (+8, −2), the difference between the integer shift and the expected shift is (−0.6, +0.2), and the closest associated sub-pixel shift is (−0.5, +0.25). If only one brosc-filtered tile 15010 is supplied (implicitly associated with zero sub-pixel shift), the integer value is preferably calculated by rounding.

Figure 18:
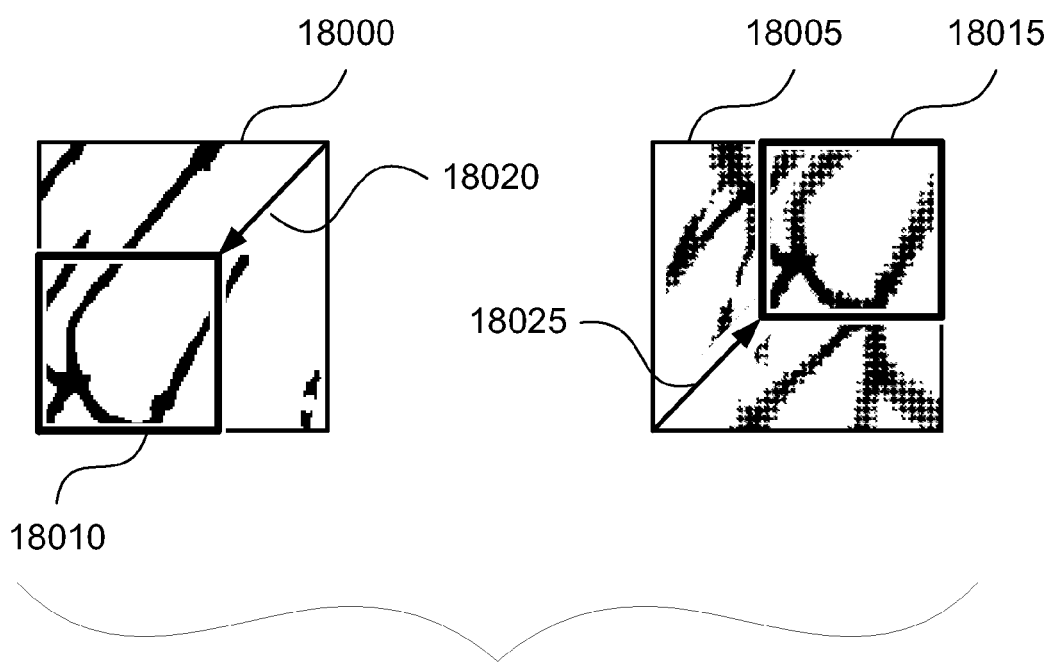
FIG. 18 shows an adjustment to target and filtered tile sub-regions, for use with some brosc transformation estimation methods.

5. In step 15050, an appropriate tile, and optionally a sub-region of that tile, is selected from the brosc-filtered tiles 15010. A brosc-filtered tile with an associated sub-pixel shift closest to the difference between the integer shift calculated at step 15040 and the excepted shift 15030 is first selected. For applications where a target tile is available, a sub-region of that tile may also be calculated. An appropriate sub-region can be calculated by intersecting the selected brosc-filtered tile with a rectangle of the same size as the target tile 15020, where the rectangle has been offset by the negation of the integer shift calculated at step 15040. An example sub-region calculation is shown in FIG. 18, using a brosc-filtered tile 18005.

6. In step 15060, an appropriate tile, or sub-region of a tile, is obtained from the target tile 15020, or from a target image.

For applications where a target tile 15020 is used, this may involve calculating a sub-region of that tile. An appropriate sub-region can be calculated by intersecting the target tile 15020 with a rectangle of the same size as the target tile 15020, where the rectangle has been offset by the integer shift calculated at step 15040. An example sub-region calculation is shown in FIG. 18, using a target tile 18000.

Figure 17:
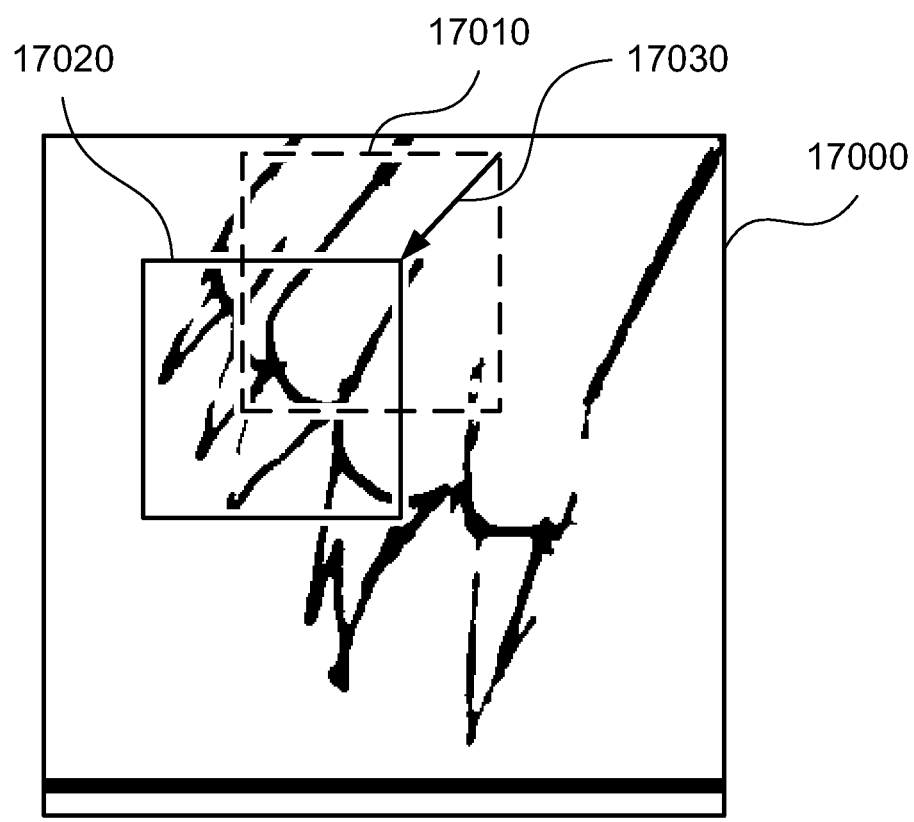
FIG. 17 shows an extraction of a target tile region, for use with some brosc transformation estimation methods.

For applications where a region within a target image is used, this may involve extracting a new tile from the image, or calculating a new region within the image. An appropriate tile or region can be obtained from a target image by intersecting the target image with a rectangle of the same size as the existing region within the image, where the rectangle has been offset from the existing region by the integer shift calculated at step 15040. Extracting a new tile may optionally include filtering, for example to remove high or low frequencies. An example tile extraction calculation is shown in FIG. 17, using a target image 17000.

7. Next, in step 15070, the brosc-filtered tile selected by step 15050 is multiplied element-wise by the tile obtained by step 15060. If steps 15050 and 15060 calculated sub-regions for the respective tiles, then the element-wise multiplication is restricted to those sub-regions.

8. Next, the multiplied elements from step 15070 are aggregated in step 15080, preferably by summing them.

9. Step 15090 calculates the parameter v of the one-dimensional transform $v=K\cdot\phi$, where $\phi$ is the complex phase of the value calculated in step 15080 (which is wrapped to between $\pm\pi$ radians), and K is a constant calculated to minimize the error in the parameter v for the parameters used to calculate the brosc filter, including the tile size, the phase range, the parameter range, the expected image content, and the type of spatial transform. The parameter v is the parameter of the one-parameter spatial transformation desired to be determined, and for example is the actual amount of rotation desired to be determined for the rotation between the images, and thus is representative of the spatial distortion in the images.

Figure 16:
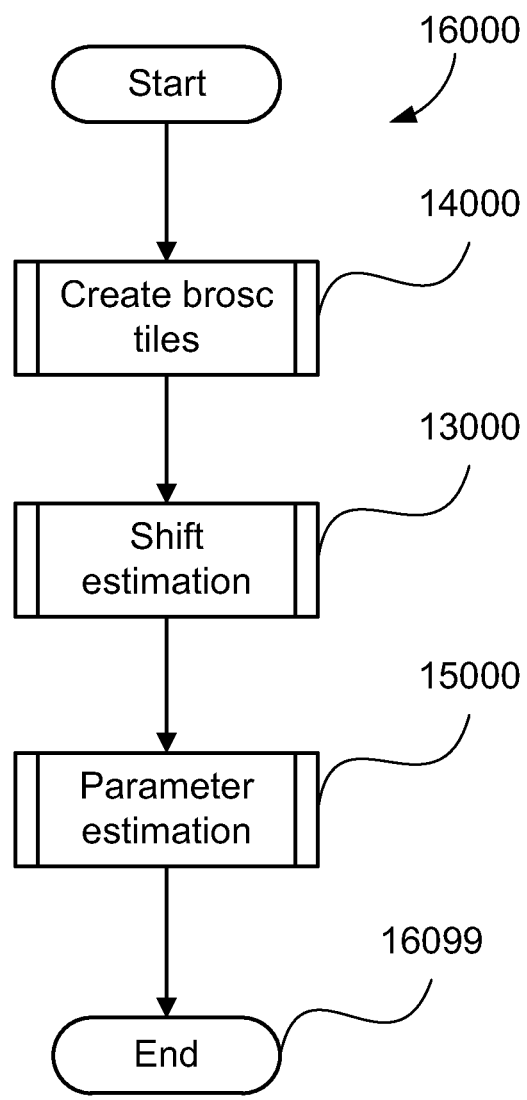
FIG. 16 shows a flowchart of a method for measuring both shift and one of rotation, scaling or other transform using a brosc filter.

FIG. 16 shows a process 16000 for shift estimation of a tile and for measuring one parameter of a spatial transform, using processes 13000, 14000 and 15000 from FIG. 13, FIG. 14 and FIG. 15.

In process 14000, one or more complex-valued brosc-filtered tiles 14050 are created from a reference tile 14010, as shown in FIG. 14. These brosc-filtered tiles 14050 will be used later, for parameter estimation.

Next, in process 13000, a real-valued brosc-filtered tile is created at step 13005 from a reference tile 13001, as shown in FIG. 13. The remainder of process 13000 receives a target tile 13002, and estimates the shift between the reference tile 13001 and the target tile 13002. In some applications, there is advantage to pre-computing the real-valued brosc-filtered tile from step 13005 along with the complex-valued brosc-filtered tiles 14050, before receiving the target tile 13002.

Next, in process 15000, the spatial-transform parameter is calculated, using the shift 15030 estimated by process 13000, one or more complex-valued brosc-filtered tiles 15010, and a target tile 15002.

Process 16000 ends at step 16099, returning the shift measured by process 13000 and the parameter measured by process 15000.

In the context of process 16000, reference tiles 13001 and 14010 are preferably the same tile. Likewise, target tiles 13002 and 15020 are preferably the same tile, and the brosc-filtered tiles 15010 are the brosc-filtered tiles 14050 created by process 14000.

FIGS. 17 and 18 illustrate how, given a shift from a brosc-filtered reference tile to a target tile, either a new target tile can be selected or sub-regions of an existing target tile and brosc-filtered reference tile can be calculated. The resulting tile or tile sub-regions should contain the same or similar data as that sourced to create the brosc-filtered tile.

In FIG. 17, a new region 17020, from which a new target tile can be extracted, is calculated within a larger image 17000. The existing region 17010 contains target data. The new region 17020 is offset 17030 from the existing region 17010 by the (preferably integer valued) shift from the reference tile to the target. The new region 17020 is the same size as the existing region 17030. A tile extracted from the new region 17020, optionally filtered, can be used to measure a spatial transform by summing the element-wise multiplication of the extracted tile with a brosc-filtered reference tile.

In FIG. 18, a sub-region 18010 of a target tile 18000 and a sub-region 18015 of a brosc-filtered reference tile are calculated. Sub-region 18010 is calculated by offsetting 18020 a rectangle of the same size as the target tile 18000 from the target tile 18000, and intersecting the rectangle with the target tile 18000. This offset 18020 is the (preferably integer valued) shift from the reference tile to the target. Sub-region 18015 is calculated by offsetting 18025 a rectangle of the same size as the brosc-filtered reference tile 18005 from the brosc-filtered reference tile 18005, and intersecting the rectangle with the brosc-filtered reference tile 18005. This offset 18025 is the (preferably integer-valued) shift from the target tile to the reference, and, as such, is the negation of offset 18020. The two sub-regions 18010 and 18015 can be used to measure a spatial transform by summing the element-wise multiplication of one against the other.

For some applications and some spatial transforms, the methods disclosed herein can be used to measure multiple-parameter spatial transforms, or equivalently, multiple single-parameter spatial transforms. This can be achieved by composing two or more brosc filters, each encoding a different spatial transform. A preferred method of composing filters is to create a brosc-filtered tile using a first filter, then create a second brosc-filtered tile by filtering the first brosc-filtered tile with a second filter. To create real-valued tiles, both filters are preferably real-valued. For complex-valued tiles, only one of the transforms is encoded in the complex phase, preferably by using one real-valued filter and one complex-valued filter. In this case, additional brosc-filtered tiles can be created with similar pixel values, but encoding a different transform in the complex phase.

Figure 20:
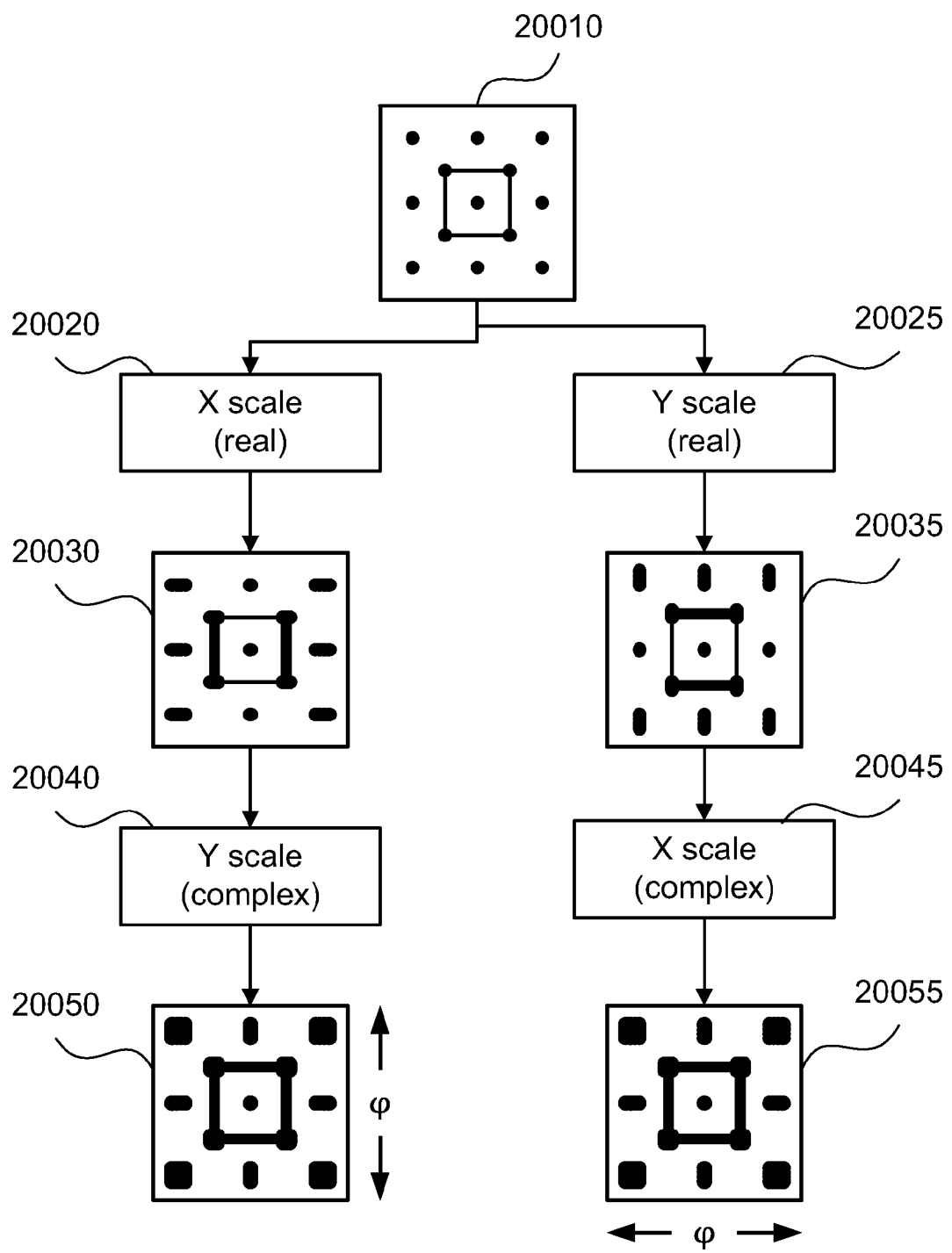
FIG. 20 shows a schematic flow diagram of a method for creating a brosc-filtered tiles for measuring multiple spatial transform parameters.

FIG. 20 illustrates the creation of complex-valued brosc-filtered tiles suitable for measuring independent scaling in X and in Y. Starting tile 20010 is filtered at step 20020 by a real-valued brosc filter for X scaling, resulting in a real-valued tile 20030. Tile 20010 is also filtered at step 20025 by a real-valued brosc filter for Y scaling, resulting in a real-valued tile 20035. Tile 20030 is filtered at step 20040 by a complex-valued brosc filter for Y scaling, resulting in a complex-valued brosc-filtered tile 20050; tile 20035 is filtered at step 20045 by a complex-valued brosc filter for X scaling, resulting in a complex-valued brosc-filtered tile 200550. The complex phase of pixels in tile 20050 encode Y-scale factors; the complex phase of pixels in tile 20055 encode X-scale factors.

Tiles 20050 and 20055 can be used with methods such as 15000 from FIG. 15, by applying method 15000 twice, once for each tile. Tile 20050 can be used to measure Y scaling and tile 20055 can be used to measure X scaling in a target tile that has undergone independent scaling in X and Y.

Note that alternative encoding schemes to complex numbers can be used to encode more than one spatial transform within the one tile. For example, 3-dimensional vectors or quaternions could be used to encode both X and Y scaling within a single tile. Here, a first filtering step (say, for X scaling) encodes parameters of a first transform in one dimension of the encoding scheme; a second filtering step (say, for Y scaling) encodes parameters of a second transform in another dimension of the encoding scheme. The resulting tile can be used with methods such as 15000 to simultaneously measure two spatial transforms.

The improved shift and angle estimation methods can be used in a variety of applications. One application is within an output checker. An output checker is a system for ensuring that all pages emitted by a printer are free of defects. An output checker can have many configurations, but for the purposes of this description, only one will be described.

Figure 8:
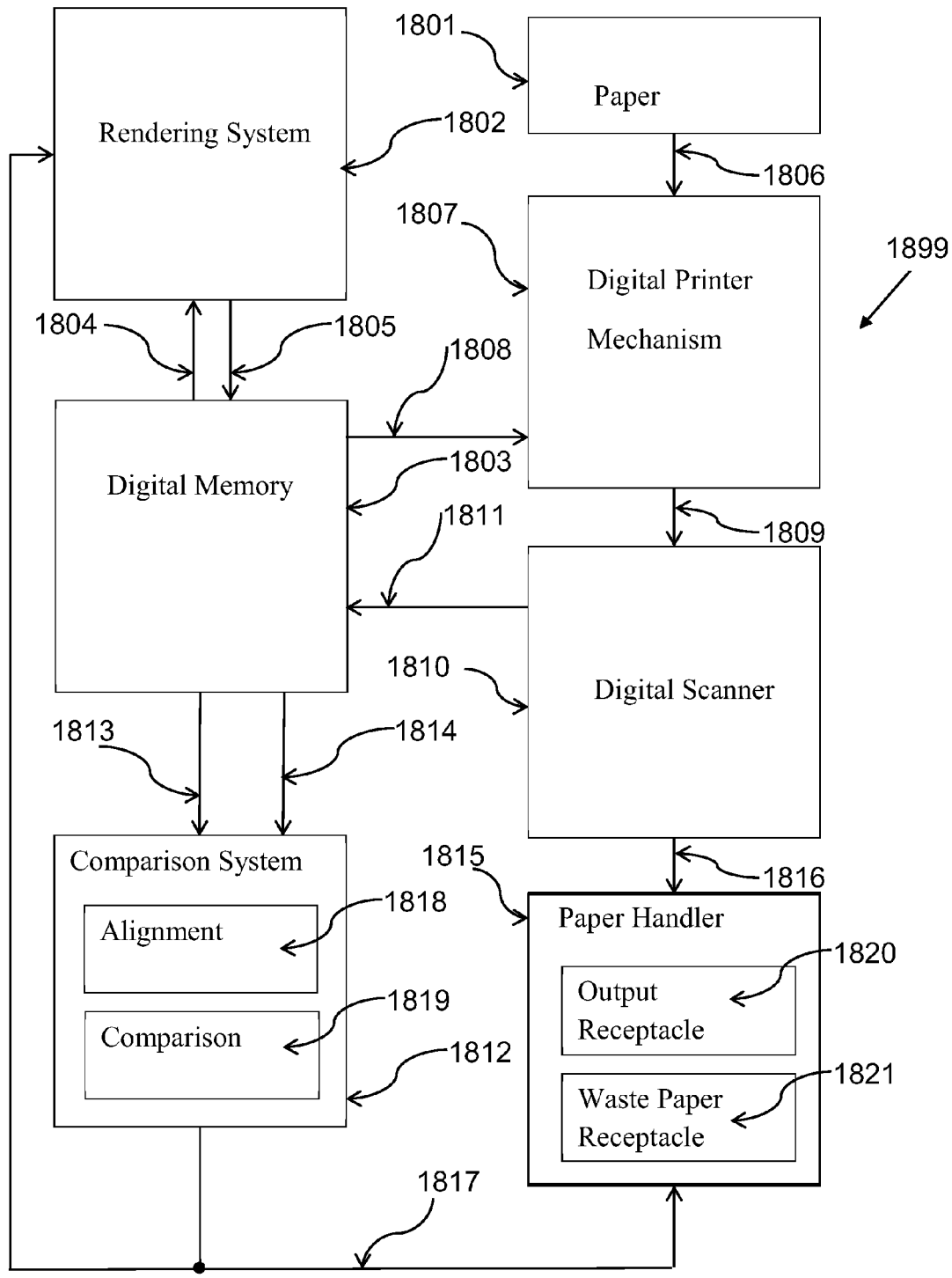
FIG. 8 shows a schematic block diagram of an example printer output checker system.

FIG. 8 shows an example output checker 1899 in schematic form, and with which the process of printing and output-checking one page will be described. The output checker 1899 may be formed within the computer system 2200 of FIG. 12, and sometimes entirely within the printer 2215.

While a sheet of paper print medium 1801 is fed 1806 into a digital printing mechanism 1807, a rendering system 1802 reads 1804 a page description language (PDL) describing a page to be printed from a digital memory 1803 onto the medium 1801. The rendering system 1802 converts the PDL into pixels, which are stored 1805 back to the digital memory 1803 as a rendered image.

The digital printing mechanism 1807 reads 1808 the rendered pixels from the digital memory 1803 and creates an image on the paper 1801 using some physical reproduction process, such as electrophotographic or inkjet printing. The paper 1801 is fed 1809 from the digital printing mechanism into a digital scanner 1810 where the image on the printed page is digitized, with all of the distortions and printing errors, and the digitized pixels are written 1811 back into the digital memory 1803 as a scanned image.

The rendered image 1805 and the scanned image 1811 are read by a comparison system 1812 and compared to find relevant printing defects. The comparison system 1812 includes two components. Comparing the two images first requires that the images be aligned with a near-pixel-accurate correspondence so that comparison can occur. An alignment part 1818 measures spatial distortion between the rendered image 1805 and the scanned image 1811, and generates a spatial transformation to relate the two. A comparison part 1819 uses the generated spatial transformation to examine corresponding pixels in the two images, noting the degree and extent of any printing defects present. Based upon some threshold of defect severity, a decision is made as to whether the printed page is "good" or "bad", and this decision is conveyed as a control signal 1817 to a paper handler 1815 and the rendering system 1802. As the paper is fed 1816 from the digital scanner 1810 into the paper handler 1815, the paper handler 1815 uses the control signal 1817 to decide where to direct the paper. If the signal is "good", then the paper handler 1817 directs the paper to an output receptacle 1820, otherwise the paper handler 1817 directs the paper to the waste paper receptacle 1821. If a "good" control signal is transmitted to the rendering system 1802, then the rendering system 1802 will advance to printing the next page, otherwise the rendering system 1802 may be configured to again commence re-rendering the same page, in an attempt to avoid printing defects.

The present disclosure is particularly concerned only with the alignment part 1818 of the comparison system 1812.

Calculating such an alignment is difficult because there are many spatial distortions introduced during the printing process, including optical and mechanical effects during the scanning process, paper stretching due to heating and pressing, and page rotation and translation as the paper moves through the print path.

If a defective page is to be detected before the next page is printed, this comparison must be effected in real-time as such applies to the printing system, usually in substantially less than one second.

One way to estimate the spatial distortion of a printed page is to perform shift estimation in several tiles at appropriate points across the printed page. It is convenient to select these tiles across the page to be used for comparison before the page is printed, and alignment will be more accurate if these tiles are chosen for their alignment measuring potential, and also distributed as uniformly across the reference image as is possible. This process is called "patch selection".

Because a small rotation can substantially shift the tiles in the target image relative to the reference image, there is great value in using the initial shift estimates to predict the shift in subsequent estimates, which allows the position of tiles in the target image to be predicted with more accuracy. One way to use the initial shift estimates is to use a least-squares technique to find a best-fit affine transform between the target and the reference image.

However, to predict a full affine transform using a least-squares fit requires a minimum of three shift estimations, and to predict an RST (rotation/scale/translation) transform requires at least two. To achieve accurate predictions, more estimates should be taken.

Using the presently disclosed brosc filter however, both translation and rotation angle can be predicted from a single pair of tiles. In the output checker 1899 application, there is likely to be very little distortion due to scaling or to changes in aspect ratio, so that a single measurement using the brosc filter is able to substantially predict any global transformation between the target and the reference images.

It is preferred that fewer tiles are used to determine the global transform because, as the global affine estimate improves, faster shift estimation methods can be used. Correlation can be used to measure a substantial shift between a pair of tiles, but correlation is very slow. Gradient-based shift estimation is much faster, but can only be used where the shift is below 1 to 4 pixels.

This alignment takes the form of a combination between a global image transform, such as an affine transform, and a local residual transform, such as an image-based mapping of pixels between the reference and the target image.

Figure 9:
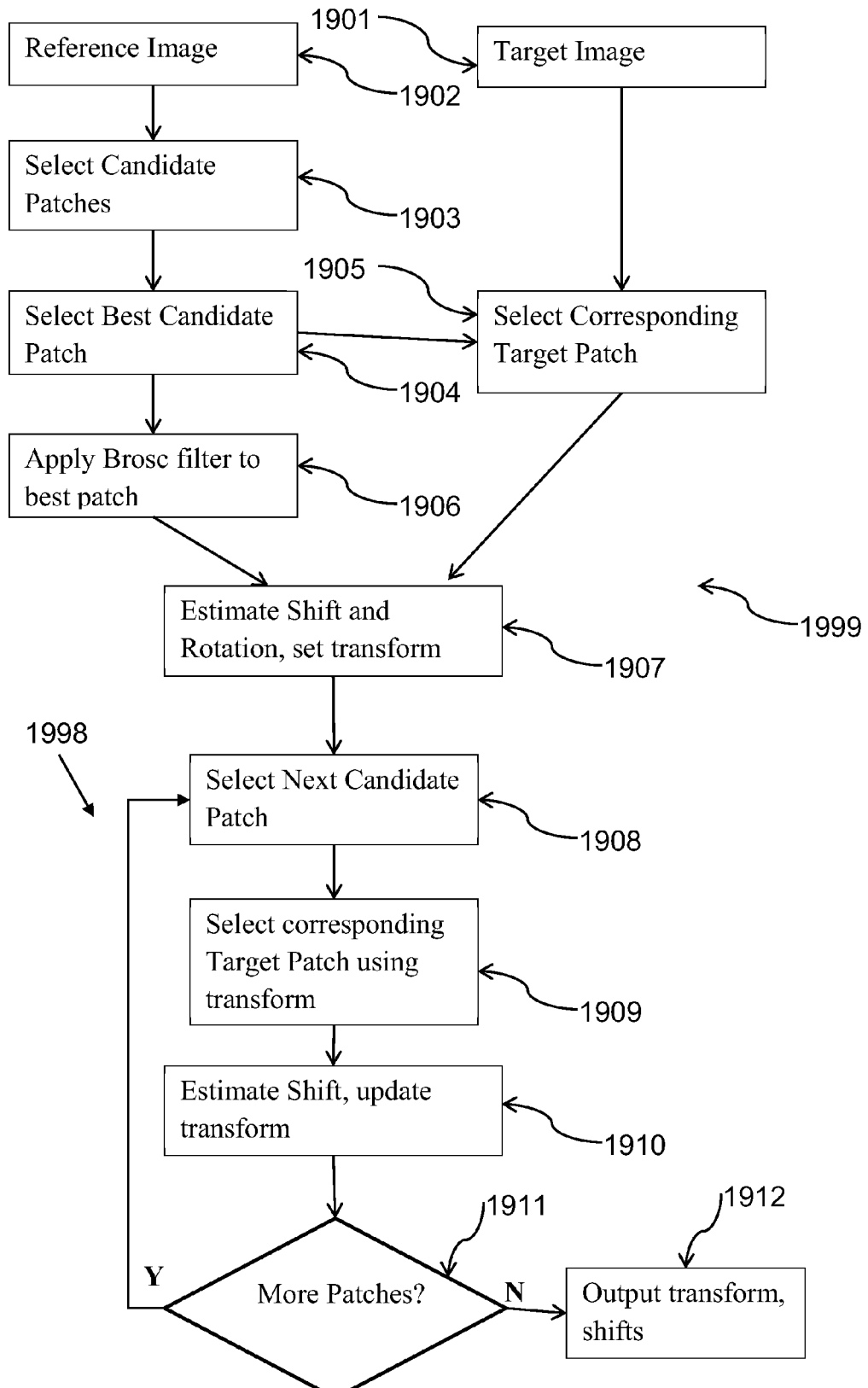
FIG. 9 shows a flowchart of a method for aligning two documents using a brosc filter for initial estimation of rotation angle.

FIG. 9 shows a method 1999 of the operation of an example alignment system that may be implemented as part of the output checker 1899. The alignment system and method 1999 are preferably implement as software stored within the output checker 1899 and executed by various components thereof.

The method 1999 of the alignment system takes as input a target image 1901 and a reference image 1902. The reference image 1902 is usually generated before generation of the target image 1901, and is likely to be noise-free and defect-free. For example the reference image 1902 may be a computer generated "ideal" image, whereas the target image 1901 may be print of the reference image 1902 and thus subject to printing errors. Alternatively, the target image may be a copy image obtained from a photocopy process or a scanning process. In any event, the two images 1901 and 1902 are related in that they share image content which is likely degraded in some way. The content however need not be identical. For example the images may be generally adjacent frames from a video sequence. The reference image 1902 is used to select candidate patches at step 1903 at which shift estimation is to be performed. Candidate patches can be chosen by picking local maxima of a Harris corner detector, and chosen to be distributed over as much of the page as is practicable.

The best candidate patch is selected in step 1904 as a tile, hereafter referred to as the reference tile, from the reference image 1902, and via step 1905, the location of the best candidate patch in the reference image 1902 is used to select a correspondingly located target patch from the target image 1901.

The brosc filter is applied to the reference tile in step 1906, to prepare the reference tile for shift estimation.

Both shift and rotation angle at the position of the best candidate patch are then estimated, and an initial spatial transformation initialized using this shift and rotation angle, in step 1907. This is preferably performed using complex correlation or similar, as shown in FIG. 7. An advantage of this approach is that a single correlation operation, which is relatively computationally expensive, determines values for both displacement shift and rotation, essentially simultaneously and certainly quicker than separate determinations.

A main loop 1998 of the alignment estimation algorithm is now entered, and initially in step 1908 the next candidate patch is selected from the reference image 1902. In step 1909, a corresponding target patch is selected by applying the current spatial transformation to the position of the candidate patch in the reference image. In step 1910 shift estimation performed on the reference and the target tile, which can be performed by correlation, GBSE, or other shift determinative methods as appropriate for the expected shift amount.

If there are more patches to process, as determined in step 1911, the algorithm will loop to process more patches at step 1908, otherwise the measured shift estimations are output at step 1912 as a global transform for the two images 1901 and 1902, together with any residual shifts. These components may be combined to create a spatial transformation which can be used to form a pixel-to-pixel correspondence between the reference image 1902 and the target image 1901 for image comparison to complete the operation of the output checker 1899.

A schematic comparison of two images 1301 and 1302 of a (cartoon) dinosaur is shown in FIG. 3.

A reference image 1301, is to be compared against a target image 1302, which in this example has been rotated by −2° (i.e. clockwise by 2°). A patch selection process as previously described has chosen three tiles 1303, 1304 and 1305 in the reference image 1301 which will be used to determine spatial distortion. Without any knowledge of spatial distortion, an identity transformation is assumed, and the expected positions of the three chosen tiles in the target image 1302 will be in the respective positions shown by tiles 1306, 1307 and 1308. Note that tiles 1307 and 1308 in the target image 1302 are displaced substantially from the matching features in the reference image 1301, and are missing part of the black border of the image 1301, which may result in shift estimation errors.

If the tile 1303 extracted from the reference image 1301 is processed by the complex brosc filter, then both the translation and the rotation angle may be determined by examination of the complex peak position and phase after correlation with the matching tile 1306 in the target image 1302. With both shift and rotation angle known, this allows the position of tiles 1307 and 1308 in the target image 1302 to be re-estimated, resulting in tiles 1309 and 1310 to be extracted instead. Because these tiles 1309 and 1310 with the refined positions will better match the corresponding tiles 1304 and 1305 in the reference image 1301, the tiles 1309 and 1310 are likely to produce better shift estimates. Depending upon the trade-off between accuracy and speed, the brosc method could be used on tiles 1304 and 1305 before correlation to improve measurement accuracy, or the tiles 1304 and 1305 could be directly rotated, or no correction need be performed if the resulting measurement error was acceptable.

After sufficient shift and/or rotation estimates are made, a global affine transform or warp map may be derived and used to compare pixels between the reference image 1301 and the target image 1302.

Another application for the brosc method is as a component in a system to estimate the distance, or depth, of objects imaged by a digital camera.

By taking at least two images captured at different focus positions, or different aperture settings, information can be gleaned about the depth of objects imaged by the sensor. This technique is called depth from defocus.

As is well known, the sharpness of focus of objects imaged on a sensor of the camera 2227 by a lens will depend upon the focus position of that lens. Less well known, the magnification of an imaged object will often change predictably according to the focus position of the lens.

By comparing several related images of a scene captured by a camera in quick succession, both the local image blur and the local image magnification can be estimated at several positions in the scene, and a depth estimated for these each position as a function of these two quantities.

In some camera lenses, changing the focus position is not reliable, because the focus mechanism can skip focus-positioning pulses, resulting in an unknown focus position. In this case, a measurement of local magnification can be used to compute the true focus position.

The estimated positions can be interpolated to generate a depth estimate over the whole scene, and this interpolation can include discontinuities at estimated image boundaries to segment the depth map into distinct objects.

A change in relative blur between corresponding positions in two images can be estimated by estimating the point spread function modelled as a Gaussian, and local magnification can be estimated by measuring the local displacement of features in the images at several points, and fitting these displacements to an affine transform.

However, the calculation of depth from defocus is difficult, for several reasons.

Firstly, it is likely that there will be motion in the gathered images, from a variety of factors. The camera 2227 itself may be in motion, creating a global linear motion over the entire scene, or the objects in the scene may themselves be in motion, creating local linear motions in parts of the scene.

Secondly, shift estimation between tile pairs where each tile has different amounts of sharpness, can fail, because defocus blurring can lead to contrast reversal at some image frequencies. Contrast reversal is a common occurrence in blurred images taken with a lens in which dark and light values are actually reversed in some spatial frequencies. As the defocus is different in a tile pair, the contrast reversal frequencies may be different in each tile. This contrast reversal variation between tiles can substantially damage the correlation peak, because parts of the tiles will be anticorrelated, resulting in a negative contribution of those frequencies to the peak at the true shift position. This damage may be reflected as a broadening, or stretching, of the correlation peak, or it may be misshapen, in the form of an annulus, or may even result in the correlation peak having multiple maxima.

Thirdly, the measurement of displacement and sharpness must necessarily be a tile or region-based operation, but it is highly likely that the depth in a single tile may vary quite markedly over that tile.

Fourthly, the measurement of displacement and sharpness is extremely image-dependent, and different results will be obtained in uniform regions of the image, or near sharp edges, or highly textured regions.

In combination, these effects lead to many inaccuracies. As with the application 1999 to the output checker 1899, small changes in magnification lead both to errors in shift estimation, and large displacements between tile pairs, damaging shift estimation still further. The large displacements between tile pairs will also damage sharpness estimates, as the common overlapping areas will be smaller.

Many of these effects can be substantially ameliorated by using the complex brosc method to filter one of the tile pairs before correlation, and to then estimate magnification (which is relative scaling) from the phase of the resulting correlation peak.

Relative motion between tiles can be estimated more accurately using the brosc method, because the correlation is more robust to small scaling factors.

The brosc method is vulnerable to contrast reversal, but a small modification of the method ("modified brosc method") can resolve this problem. During calculation of the correlation image, the penultimate stage contains the Fourier transform of the correlation peak. If contrast reversal is present, then some frequencies in this Fourier transform will be negated. According to the modified brosc method it is possible to correct the sign of the negated frequencies by doubling the phase of every frequency. This phase doubling will also double the displacement of the correlation peak from the origin, limiting the maximum measurable displacement, and will also double the magnitude of the phase noise, reducing the noise tolerance of the method. Where the complex brosc method is used, the modified brosc method will also double the phase of the correlation peak, so that the frequency of the brosc kernel should be halved to avoid wrapping around of the phase representing scale measurement.

Where depth varies substantially over a single tile, the brosc method can still produce more accurate results than direct correlation, but it may be necessary to reduce the frequency of the brosc kernel so that its extent is less than 180°, so that contributions to the correlation peak from different depths are not anti-correlated.

In combination, all of these effects contribute to more accurate displacement estimates, and hence better image alignment, resulting in more accurate depth-from-defocus measurements.

There is also a further effect which makes the brosc method desirable for depth-from-defocus measurements, which is that magnification can be estimated on the basis of a single tile correlation. Without using the brosc method, magnification is estimated by fitting a scaling parameter to multiple displacement estimates, which can never give an estimate localized to a single tile. A tile-based magnification estimate suits depth-from-defocus algorithms very well, because both tile sharpness and tile magnification can be measured and combined simultaneously, and locally.

Figure 10:
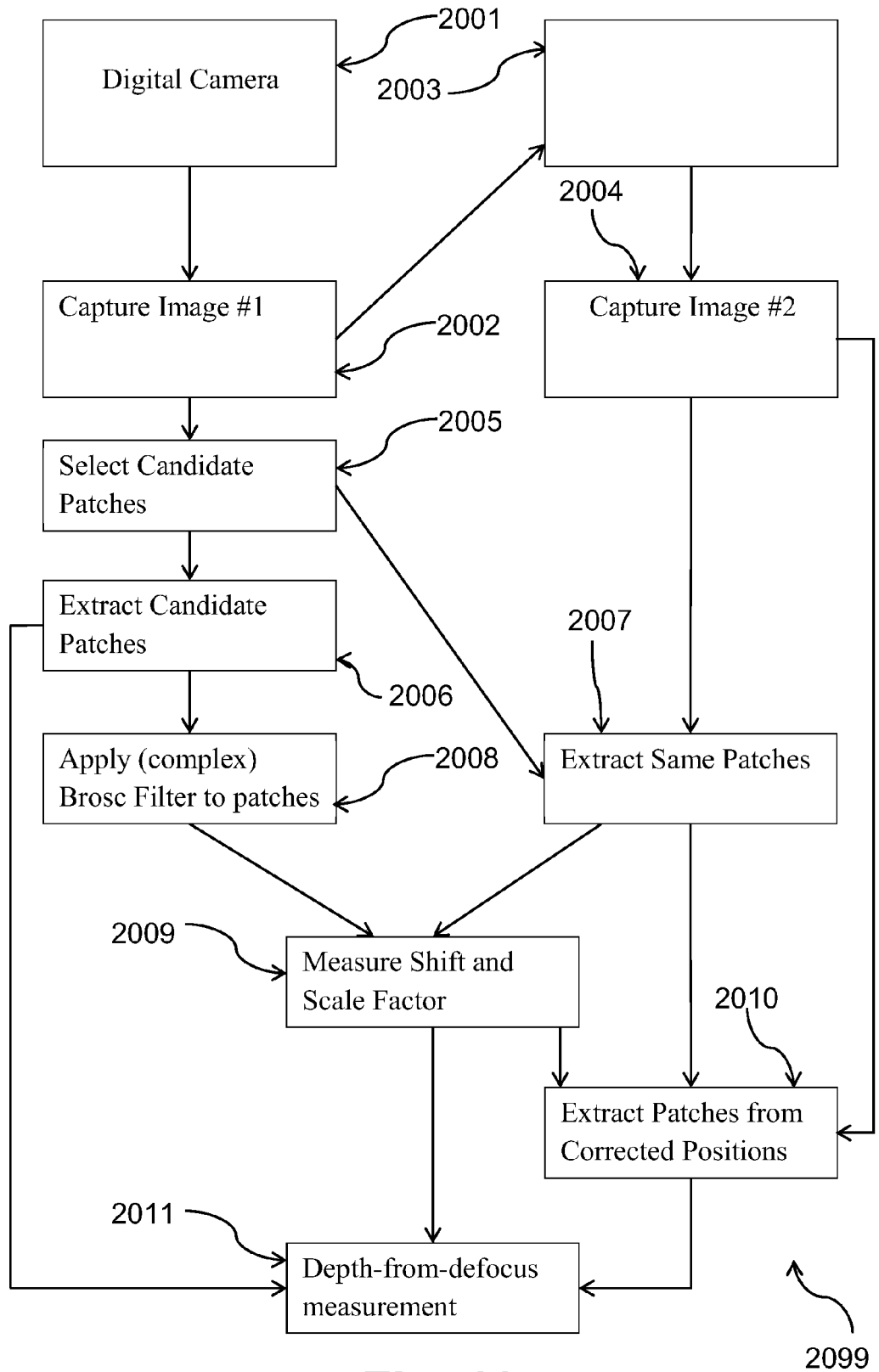
FIG. 10 shows a schematic flow diagram of a depth-from-defocus measurement system using a brosc filter.

FIG. 10 shows the operation of one depth-from-defocus method 2099 with the assistance of the brosc algorithm.

The method 2099 uses the digital camera 2227 from FIG. 12A to capture a first image 2002 at a first focus position, whereupon the focus of the camera 2227 is changed at step 2003 to a different focus position, and a second image 2004 is captured. The images 2002 and 2004 are related in that they share common or substantially common scene content but for which differences between the two are significantly influenced by the change in focus.

From the first captured image 2002, candidate patches are selected in step 2005 containing sufficient detail for depth-from-defocus measurement. The selected candidate patches are extracted as tiles in step 2006 from the first captured image 2002, and the complex scaling brosc filter applied to each patch in step 2008.

Corresponding patches are also extracted as tiles in step 2007 from the second captured image 2004.

The brosc-filtered tiles from the first image 2002 are then correlated against the corresponding tiles from the second image 2004 in step 2009, in which shift is estimated by measuring the position of the complex peaks, and scale factor or relative magnification is also estimated, by measuring the complex phase of the complex peaks. An advantage of this approach is that a single correlation operation, which is relatively computationally expensive, determines values for both displacement shift and scale factor, essentially simultaneously and certainly quicker than separate determinations.

The position of each patch in the second image 2004 is corrected in step 2010 using the measured shifts from step 2009, and tiles extracted in step 2007 from the second image 2004 using their corrected positions.

Using magnification estimates from step 2009, and by analysing differences in corresponding patches from the first captured image 2002 obtained from step 2006 and the second captured image 2004 obtained from step 2010, image depth is then estimated at the candidate patch positions in step 2011.

Another application for the brosc filter is to assist in aligning frames from images distorted by motion during a raster-scanning acquisition process. One example of such an image acquisition device is an adaptive-optics scanning laser ophthalmoscope (AO-SLO). This device uses adaptive optics to both focus a tiny spot of laser light on the retina of a patient, and also to direct this light to a pixel sensor to measure the amplitude of the light. By means of an oscillating mechanical system, the laser spot can be made to trace out a rectangular region in a raster-scan fashion, thereby producing a high-resolution image of the retina. By continually scanning the laser and acquiring the light, a two-dimensional video sequence of a small region of the eye can be obtained.

While the frame-rate of this video sequence is quite high, 60 Hz typically, the eye is in constant motion, resulting in the field of view shifting around as the sequence of frames is gathered. By aligning frames in the video sequence, a common field of view can be obtained for many frames by aligning images to each other, or to a single common image. This can be achieved by correlation-based shift estimation.

However, the eye can also exhibit extremely rapid movement, called a saccade, which can result in very strong image distortion as the eye moves beneath the raster scan while an image is being gathered.

This can result in very strong image distortion if the eye happens to move in the same direction as the slow scan direction of the raster scan, which could be in any direction, but can be typically assumed, for the sake of explanation, to be the X-direction (i.e. along a scan line), consistent with most video displays. In such an example, the complementary fast scan direction would be the Y-direction (i.e. between scan lines). Distortion will occur in the slow scan direction. For example, if the slow raster scan is at 10 radians per second, and a saccade moves the eye at 20 radians per second, then the scanned image will be scaled by a factor of 50%, or 150%, depending upon whether the saccade moves respectively with, or against, the direction of the raster scan.

Such a large distortion has a significantly deleterious effect upon shift estimation between frames. As with rotation or two-dimensional scaling, a one-dimensional scaling of only 5-10% can ruin shift estimation.

As with the effects of rotation and scaling on shift estimation, the effects of scaling in the slow scan (X direction) on shift estimation can be mitigated by the use of a brosc filter. For rotation and scaling, a spatially-varying filter is applied, respectively, in a tangential or radial direction with respect to the image radius, with the length of the filter being proportional in length to the radius. For scaling in the X direction, a spatially-varying filter is applied in a direction parallel to the X axis, with the length of the filter proportional to the distance in the X direction from a central position in the image. By using a complex kernel with phase varying linearly within the kernel, proportional to the kernel's length, and changing in a direction away from the centre of the image, using the brosc filter before correlation-based shift estimation will result in a magnitude peak with the complex phase of the peak varying in proportion to the amount of X scaling in the target image. As with the case of rotation and scaling, use of the complex phase kernel results in a more robust shift estimation compared with either direct correlation or correlation using a real brosc filter.

By using the complex phase of the correlation peak to estimate a scaling factor, a more accurate position for multiple sub-images can be estimated before further shift estimations to increase the accuracy of spatial distortion measurements within an image.

Figure 11:
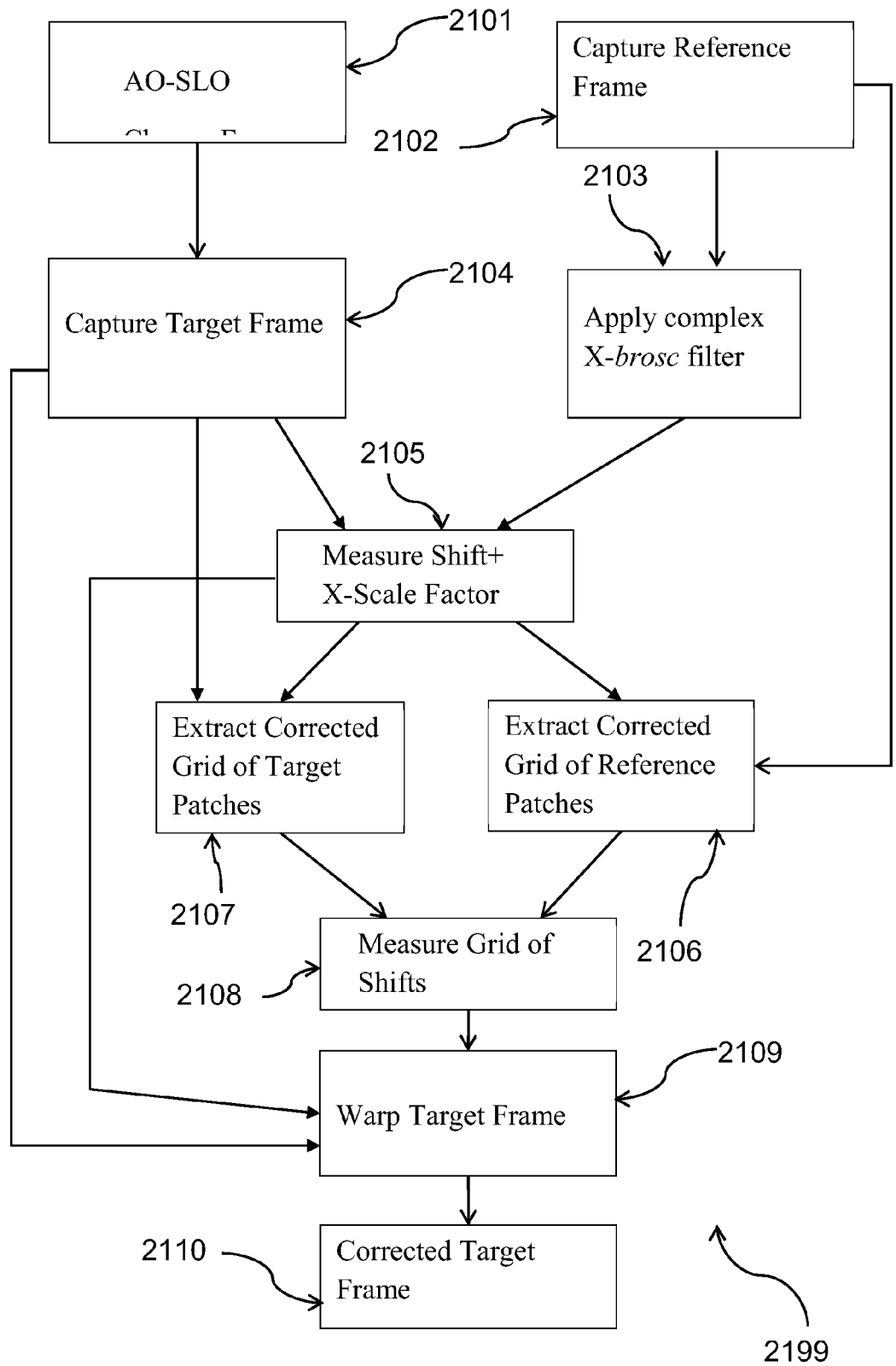
FIG. 11 shows a schematic flow diagram of an ophthalmic imaging system using a brosc filter to assist with image registration.

FIG. 11 shows a method 2199 that uses the complex X-brosc filter to register target frames acquired from an AO-SLO device to a reference frame. The method 2199 stored on the HDD 2210 and executed by the processor 2205 of the computer 2201, having received images from an AO-SLO device 2101, for example via one of the networks 2220 or 2222.

In the method 2199, the AO-SLO device 2101 is used to capture a reference frame 2102, which is chosen to have good image quality and low distortion.

A complex X-brosc filter is applied in step 2103 to the reference frame 2102 to create a template which is robust to X scaling and can also provide an X-scaling estimate.

A target frame 2104 to be aligned to the reference X-frame 2102 is also acquired by the AO-ALO device 2101. The frames 2102 and 2104 may be related video frames and are typically adjacent video frames.

The target frame 2104 and filtered reference frame from step 2103 are then correlated in step 2105, within which the position and phase of the correlation peak is used to estimate both relative shift between the frames, and relative X-scaling. This estimated shift and X-scaling constitute a "coarse alignment" between corresponding patches of the frames 2102 and 2104.

This relative shift and X-scaling factor are used to determine an overlap area between the target frame 2014 and the reference frame 2102, and a 6×6 grid of patches is extracted in step 2107 from the patches of the target frame 2104 and a 6×6 grid of patches is extracted in step 2106 from the patches of the reference frame 2102.

Shift estimation on each corresponding patch is then performed at step 2108 and gives an estimate of shift on a 6×6 grid in the overlap area in both the target and reference images, and this 6×6 grid of shift estimates constitutes a "fine alignment" between the reference and the target images 2102 and 2104.

The coarse alignment obtained from step 2105 and the fine alignment from step 2108 are combined together in step 2109 and used to warp the target frame 2104 that the target frame 2104 is able to registered over the reference frame 2102.

The output of warping process of step 2109 is a corrected target frame 2110, which can be stored in the HDD 2210 and subsequently be more easily compared with the reference frame 2102.

INDUSTRIAL APPLICABILITY

The arrangements described are applicable to the computer and data processing industries and particularly for the estimation of shift and small distortions between images. The arrangements have application in a number of areas. Firstly, the determination of shift, rotation and scale permit image capture parameters, such as focus and depth-of-field, to be determined from related images. As discussed the arrangements may be used for output checking of printing processes and for ophthalmic measurements. In each of these examples, the reference and sample images are known.

The arrangements may be further used to determine if two images are related. For example, the arrangements may be used to search a database of images for images that may be related to a source image. In these instances, only the source image is known. For images in the database that are completely unrelated, large displacements, no correlation or at best poor correlation will be determined. However, for images that are more closely related, the extent of displacement and/or correlation will be significant by comparison, enabling at least short-listing of most likely matches to the source image.

In further implementations, for example based upon those described with reference to FIGS. 14 and 15, the described method of measuring displacement may be modified t or otherwise used to determine a spatial distortion parameter. Particularly, the spatial distortion parameter may be determined using complex phase and without knowledge of how the filtered reference tile was created. The described multiply and aggregate (sum) approach can also be used, given a shift estimation, to determine distortion. This approach is applicable when the shift is known rather than measured, and when the shift is zero. Also the multiply and sum approach may be performed with a collection of sub-pixel shifted patches, including the selection of a closest patch.

A further implementation, derived from the disclosure of FIG. 16, relates to combining the steps of using a brosc real filter for shift estimation, and multiply-then-sum approach for distortion parameter determination. (FIG. 16).

Another implementation, associated with FIG. 20, reveals the use of a spatial transform with more than one parameter.

Here in a specific implementation, the transform can be decomposed into multiple single parameter transforms.

The arrangements described use complex phase as an encoding for the shift or distortion parameters. Other parameter encodings may be used. Particularly, when using the multiply-and-sum approach (and since such does not rely on FFT correlations), other encodings such as using two (2) or higher dimensional vectors, or vectors/complex numbers that have been split across multiple real-valued images.

The foregoing describes only some embodiments of the present invention, and modifications and/or changes can be made thereto without departing from the scope and spirit of the invention, the embodiments being illustrative and not restrictive.

We claim:

1. A method of measuring the displacement between a reference region of a reference image and a sample region of a sample image, the method comprising:
   spatially varying the reference region using a one-dimensional filter, wherein a length and direction of the filter is a function of position in the reference region; and
   measuring a displacement between the reference region and the sample region by comparing the spatially varied reference region and the sample region,
   wherein the one-dimensional filter comprises complex kernel values.

2. The method according to claim 1, wherein the reference region and the sample region are compared by matching the regions using correlation, the matching comprising:
   determining a location of a maximum correlation value of a correlation of the reference region and sample region; and
   using the location of the maximum correlation value to estimate the displacement between the reference region and the sample region.

3. The method according to claim 2, wherein a phase of the maximum correlation value is used to further determine a spatial distortion parameter between the reference region and the sample region.

4. The method according to claim 1, wherein the comparing of the regions comprises performing a shift estimation upon the regions.

5. The method according to claim 4 wherein the shift estimation comprises gradient-based shift estimation.

6. The method according to claim 1, wherein the reference region and the sample region are corresponding regions of related images.

7. A computer apparatus comprising at least a processor and a memory, the memory having recorded therein a program executable by the processor to cause the computer apparatus to execute a method to measure the displacement between a reference region of a reference image and a sample region of a sample image, the method comprising:
   spatially varying the reference region using a one-dimensional filter, wherein a length and direction of the filter is a function of position in the reference region; and
   measuring a displacement between the reference region and the sample region by comparing the spatially varied reference region and the sample region,
   wherein the one-dimensional filter comprises complex kernel values.

8. The method according to claim 1, wherein the reference region is filtered to create an image having a strong correlation at all rotation angles within a desired range.

9. The method according to claim 8, wherein the reference region is filtered such that each pixel in the filtered reference region of the reference image is replaced by a mean value of the pixels which intersect each replaced pixel, or pixel location of each replaced pixel, through rotation by an angle range, the use of the mean value confining a determination to a real domain.

10. The method according to claim 9, wherein at least one of:
   (i) during correlation with a rotated sample image, the pixels in the filtered reference image contain a partial match with every overlapping pixel in the sample image;
   (ii) correlation accuracy with the filtered reference image is smaller at 0° than with the unfiltered image, but correlation accuracy is much greater than the unfiltered image for rotation angles within the rotation or angle range;
   (iii) when shift is measured by correlation between the filtered reference region and the sample region, a correlation peak width remains consistently narrow across the whole rotation or angle range, and provides an accurate estimate of shift between a center of rotation of the filtered reference portion and the corresponding location in the sample image; and
   (iv) if the center of rotation used for the filter is in a center of the filtered reference portion, then the correlation will accurately measure the distance between the center of the filtered reference portion and the corresponding location in the sample image.

11. The computer apparatus according to claim 7, wherein the reference region is filtered to create an image having a strong correlation at all rotation angles within a desired range.

12. The computer apparatus according to claim 11, wherein the reference region is filtered such that each pixel in the filtered reference region of the reference image is replaced by a mean value of the pixels which intersect each replaced pixel, or pixel location of each replaced pixel, through rotation by an angle range, the use of the mean value confining a determination to a real domain.

13. The computer apparatus according to claim 12, wherein at least one of:
   (i) during correlation with a rotated sample image, the pixels in the filtered reference image contain a partial match with every overlapping pixel in the sample image;
   (ii) correlation accuracy with the filtered reference image is smaller at 0° than with the unfiltered image, but correlation accuracy is much greater than the unfiltered image for rotation angles within the rotation or angle range;
   (iii) when shift is measured by correlation between the filtered reference region and the sample region, a correlation peak width remains consistently narrow across the whole rotation or angle range, and provides an accurate estimate of shift between a center of rotation of the filtered reference portion and the corresponding location in the sample image; and
   (iv) if the center of rotation used for the filter is in a center of the filtered reference portion, then the correlation will accurately measure the distance between the center of the filtered reference portion and the corresponding location in the sample image.

14. A method of measuring the displacement between a reference region of a reference image and a sample region of a sample image, the method comprising:
   spatially varying the reference region using a one-dimensional filter, a length and direction of the filter being a function of position in the reference region, wherein the length of the filter increases towards edges of the reference image; and measuring a displacement between the reference region and the sample region by comparing the spatially varied reference region and the sample region.

15. A computer apparatus comprising at least a processor and a memory, the memory having recorded therein a program executable by the processor to cause the computer apparatus to execute a method to measure the displacement between a reference region of a reference image and a sample region of a sample image, the method comprising:

spatially varying the reference region using a one-dimensional filter, wherein a length and direction of the filter is a function of position in the reference region; and measuring a displacement between the reference region and the sample region by comparing the spatially varied reference region and the sample region, wherein the length of the filter increases towards edges of the reference image.

* * * * *